United States Patent
Zhang

(10) Patent No.: US 10,841,960 B2
(45) Date of Patent: Nov. 17, 2020

(54) MEDIA ACCESS CONTROL METHOD AND WIRELESS ACCESS DEVICE

(71) Applicant: HUAWEI TECHNOLOGIES CO., LTD., Guangdong (CN)

(72) Inventor: Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/211,948

(22) Filed: Dec. 6, 2018

(65) Prior Publication Data

US 2019/0191465 A1   Jun. 20, 2019

Related U.S. Application Data

(63) Continuation of application No. PCT/CN2017/087193, filed on Jun. 5, 2017.

(30) Foreign Application Priority Data

Jun. 6, 2016  (CN) .......................... 2016 1 0394865

(51) Int. Cl.
*H04W 74/08* (2009.01)
*H04L 29/06* (2006.01)
(Continued)

(52) U.S. Cl.
CPC ....... *H04W 74/0841* (2013.01); *H04L 1/1812* (2013.01); *H04L 29/06* (2013.01);
(Continued)

(58) Field of Classification Search
CPC ............. H04W 48/18; H04W 72/1215; H04W 74/0841; H04W 76/15; H04W 80/02; H04W 88/06; H04L 1/1812; H04L 29/06
See application file for complete search history.

(56) References Cited

U.S. PATENT DOCUMENTS

| 2011/0044218 A1* | 2/2011 | Kaur | H04W 76/16 370/310 |
| 2012/0147869 A1* | 6/2012 | Chhatriwala | H04W 28/065 370/338 |

(Continued)

FOREIGN PATENT DOCUMENTS

| CN | 102647804 A | 8/2012 |
| CN | 105165087 A | 12/2015 |

OTHER PUBLICATIONS

Extended European Search Report dated Apr. 10, 2019 in corresponding European Patent Application No. 17809693.9 (9 pages).
(Continued)

*Primary Examiner* — Mewale A Ambaye
(74) *Attorney, Agent, or Firm* — Leydig, Voit & Mayer, Ltd.

(57) ABSTRACT

This application discloses a Media Access Control method, and pertains to the field of wireless communications technologies. The method is applied to a radio access device that supports at least two types of air interfaces, and the radio access device includes dedicated control entities respectively corresponding to the at least two types of air interfaces and a common control entity. The common control entity determines a dedicated control entity corresponding to a specified air interface between the radio access device and a terminal, and interacts with the dedicated control entity corresponding to the specified air interface, to implement a Media Access Control function of the specified air interface. Execution entities of a Media Access Control MAC layer of the radio access device are divided into one common control entity and a dedicated control entity that corresponds to each of at least one type of air interface, and the common control entity interacts with the dedicated control entity corresponding to any air interface, to implement a Media Access (Continued)

Control function of the air interface, so that the radio access device in a radio communications system supports a plurality of air interfaces.

20 Claims, 23 Drawing Sheets

(51) Int. Cl.
 H04W 72/12 (2009.01)
 H04W 80/02 (2009.01)
 H04W 76/15 (2018.01)
 H04L 1/18 (2006.01)
 H04W 48/18 (2009.01)
 H04W 88/06 (2009.01)

(52) U.S. Cl.
 CPC ....... *H04W 48/18* (2013.01); *H04W 72/1215* (2013.01); *H04W 76/15* (2018.02); *H04W 80/02* (2013.01); *H04W 88/06* (2013.01)

(56) References Cited

U.S. PATENT DOCUMENTS

| | | | | |
|---|---|---|---|---|
| 2012/0281564 | A1* | 11/2012 | Zhang | H04L 1/08 370/252 |
| 2013/0117293 | A1* | 5/2013 | Mason | G06F 16/116 707/758 |
| 2014/0098797 | A1* | 4/2014 | Kanamarlapudi | H04L 1/1867 370/336 |
| 2015/0341802 | A1 | 11/2015 | Chiang et al. | |
| 2017/0156086 | A1* | 6/2017 | Tomici | H04W 36/18 |
| 2018/0145814 | A1* | 5/2018 | Liu | H04L 5/0053 |
| 2018/0288752 | A1* | 10/2018 | Parkvall | H04L 27/2656 |
| 2018/0310207 | A1 | 10/2018 | Dahod et al. | |
| 2018/0317103 | A1* | 11/2018 | Luo | H04L 41/0803 |
| 2019/0215901 | A1* | 7/2019 | Jiang | H04L 5/0005 |

OTHER PUBLICATIONS

International Search Report dated Aug. 23, 2017 in corresponding International Application No. PCT/CN2017/087193.

R3-161297, Ericsson "RAN Internal Architecture for a Flexible Function Distribution" 3GPP TSG-RAN WG3 #92, Nanjing, P.R. China, May 23-27, 2016. 4 pages.

International Search Report dated Aug. 23, 2017 in corresponding International Patent Application No. PCT/CN2017/087193 (7 pages).

Written Opinion of the International Searching Authority dated Aug. 23, 2017 in corresponding International Patent Application No. PCT/CN2017/087193 (4 pages).

* cited by examiner

MEDIA ACCESS CONTROL METHOD AND WIRELESS ACCESS DEVICE

CROSS-REFERENCE TO RELATED APPLICATIONS

This application is a continuation application, under 35 U.S.C. 111(a) of international patent application No. PCT/CN2017/087193, filed Jun. 5, 2017, which claims priority to Chinese patent application No. 201610394865.X, filed Jun. 6, 2016, the entire disclosure of which is herein incorporated by reference as part of this application.

This application claims priority to Chinese Patent Application No. 201610394865.X, filed with the Chinese Patent Office on Jun. 6, 2016 and entitled "MEDIA ACCESS CONTROL METHOD AND RADIO ACCESS DEVICE", which is incorporated herein by reference in its entirety.

TECHNICAL FIELD

This application relates to the field of wireless communications technologies, and in particular, to a Media Access Control method and a radio access device.

BACKGROUND

With constant development of wireless communications technologies, a 5th generation mobile communications (English: The 5th generation, 5G) technology network supports increasingly diversified service requirements and scenarios, for example, enhanced mobile broadband (enhanced Mobile Broadband, eMBB), massive machine type communication (massive Machine Type Communication, mMTC), and ultra reliable machine type communication (ultra reliable Machine Type Communication, uMTC).

Sometimes, services that have a relatively large difference in quality of service (English: quality of service, QoS for short) requirements impose different requirements on air interface (English: air interface, AI for short) technologies. For example, an eMBB service and a URLLC service impose different requirements on the AI technologies. Therefore, to support increasingly diversified service requirements, a radio communications system needs to support more AI technologies.

In a process of implementing this application, an inventor finds that the prior art has the following problem:

In an existing radio communications system, a radio access device (for example, a base station) usually supports only processing for a single air interface, and cannot support a multi-air interface technology.

SUMMARY

To resolve a prior-art problem that a radio access device (for example, a base station) usually supports only processing for a single air interface and cannot support a multi-air interface technology, this application provides a Media Access Control method and a radio access device.

According to a first aspect, this application provides a Media Access Control method, where the method is applied to a radio access device, the radio access device supports at least two types of air interfaces, the radio access device communicates with a terminal by using a specified air interface, the specified air interface is at least one of the at least two types of air interfaces, the radio access device includes dedicated control entities respectively corresponding to the at least two types of air interfaces and a common control entity, and the method includes:

determining, by the common control entity, a dedicated control entity corresponding to the specified air interface between the radio access device and the terminal, and interacting, by the common control entity, with the dedicated control entity corresponding to the specified air interface, to implement a Media Access Control function of the specified air interface.

In the solution of the first aspect, execution entities of a Media Access Control (English: Media Access Control, MAC for short) layer of the radio access device are divided into one common control entity and a dedicated control entity that corresponds to each of at least one type of air interface, and the common control entity interacts with a dedicated control entity corresponding to any air interface, to implement a Media Access Control function of the air interface, so that the radio access device in a radio communications system supports a plurality of air interfaces.

In a first possible implementation of the first aspect, the interacting, by the common control entity, with the dedicated control entity corresponding to the air interface includes:

obtaining, by the dedicated control entity, radio condition information of the specified air interface, and sending the radio condition information to the common control entity; and determining, by the common control entity based on the radio condition information, a radio resource interval corresponding to the specified air interface, and performing, within the radio resource interval corresponding to the specified air interface, resource scheduling for data transmitted through the specified air interface.

When the execution entities of the Media Access Control layer of the radio access device are divided into one common control entity and a dedicated control entity that corresponds to each of at least one type of air interface, this implementation provides an implementation solution of a resource scheduling function.

In a second possible implementation of the first aspect, the interacting, by the common control entity, with the dedicated control entity corresponding to the specified air interface includes:

determining, by the common control entity, size information of a Media Access Control protocol data unit corresponding to the specified air interface, and sending the size information to the dedicated control entity corresponding to the specified air interface and a radio link control entity corresponding to the specified air interface, where the radio link control entity is disposed in the radio access device;

sending, by the common control entity to the dedicated control entity, a radio link control protocol data unit delivered by the radio link control entity; and generating, by the dedicated control entity, the Media Access Control protocol data unit based on the size information and the radio link control protocol data unit that is delivered by the radio link control entity, and sending the Media Access Control protocol data unit to a physical layer corresponding to the specified air interface.

When the execution entities of the Media Access Control layer of the radio access device are divided into one common control entity and a dedicated control entity that corresponds to each of at least one type of air interface, this implementation provides an implementation solution of a MAC layer multiplexing function.

In a third possible implementation of the first aspect, the interacting, by the common control entity, with the dedicated control entity corresponding to the specified air interface includes:

determining, by the dedicated control entity, size information of a Media Access Control protocol data unit scheduled for the specified air interface, and sending the size information to the common control entity;

sending, by the common control entity, the size information to a radio link control entity corresponding to the specified air interface, and sending, to the dedicated control entity, a radio link control protocol data unit delivered by the radio link control entity, where the radio link control entity is disposed in the radio access device; and generating, by the dedicated control entity, the Media Access Control protocol data unit based on the size information and the radio link control protocol data unit that is delivered by the radio link control entity, and sending the Media Access Control protocol data unit to a physical layer corresponding to the specified air interface.

When the execution entities of the Media Access Control layer of the radio access device are divided into one common control entity and a dedicated control entity that corresponds to each of at least one type of air interface, this implementation provides another implementation solution of a MAC layer multiplexing function.

With reference to the second or third possible implementation of the first aspect, in a fourth possible implementation of the first aspect, the interacting, by the common control entity, with the dedicated control entity corresponding to the specified air interface includes:

receiving, by the dedicated control entity, data sent by the physical layer corresponding to the specified air interface, generating a Media Access Control service data unit (service data unit, SDU) based on the data sent by the physical layer, and sending the Media Access Control service data unit to the common control entity; and sending, by the common control entity, the Media Access Control service data unit to the radio link control entity corresponding to the specified air interface.

When the execution entities of the Media Access Control layer of the radio access device are divided into one common control entity and a dedicated control entity that corresponds to each of at least one type of air interface, this implementation provides an implementation solution of a MAC layer demultiplexing function.

In a fifth possible implementation of the first aspect, the interacting, by the common control entity, with the dedicated control entity corresponding to the specified air interface includes:

when the radio access device sends data to the terminal through the specified air interface, generating, by the common control entity, downlink grant information corresponding to the data, and transmitting the downlink grant information to the dedicated control entity; sending, by the dedicated control entity, the downlink grant information to the terminal by using a physical layer of the specified air interface, receiving, by using the physical layer of the specified air interface, a hybrid automatic repeat request response message that is returned by the terminal for the data, and sending the hybrid automatic repeat request response message to the common control entity; and determining, by the common control entity based on the hybrid automatic repeat request response message, to retransmit the data or send new data; and when the radio access device receives, through the specified air interface, data sent by the terminal, generating, by the common control entity, uplink grant information corresponding to the data, and transmitting the uplink grant information to the dedicated control entity; sending, by the dedicated control entity, the uplink grant information to the terminal by using the physical layer of the specified air interface; after the data is received, generating, by the dedicated control entity, a hybrid automatic repeat request response message for the data, and sending the hybrid automatic repeat request response message to the terminal and the common control entity; and generating, by the common control entity, new uplink grant information based on the hybrid automatic repeat request response message.

When the execution entities of the Media Access Control layer of the radio access device are divided into one common control entity and a dedicated control entity that corresponds to each of at least one type of air interface, this implementation provides an implementation solution of an uplink/downlink hybrid automatic repeat function.

In a sixth possible implementation of the first aspect, the interacting, by the common control entity, with the dedicated control entity corresponding to the specified air interface includes:

when the radio access device sends data to the terminal through the specified air interface, generating, by the dedicated control entity, downlink grant information corresponding to the data, sending the downlink grant information to the terminal by using a physical layer of the specified air interface, receiving, by using the physical layer of the air interface, a hybrid automatic repeat request response message that is returned by the terminal for the data, and determining, based on the hybrid automatic repeat request response message, to retransmit the data or send new data; and when the radio access device receives, through the specified air interface, data sent by the terminal, generating, by the dedicated control entity, uplink grant information corresponding to the data, and sending the uplink grant information to the terminal; after the data is received, generating, by the dedicated control entity, a hybrid automatic repeat request response message for the data, and sending the hybrid automatic repeat request response message to the terminal; and generating, by the dedicated control entity, new uplink grant information based on the hybrid automatic repeat request response message.

When the execution entities of the Media Access Control layer of the radio access device are divided into one common control entity and a dedicated control entity that corresponds to each of at least one type of air interface, this implementation provides another implementation solution of an uplink/downlink hybrid automatic repeat function.

In a seventh possible implementation of the first aspect, the interacting, by the common control entity, with the dedicated control entity corresponding to the specified air interface includes:

receiving, by the dedicated control entity, a random access request message that is sent by the terminal through the specified air interface, and sending the random access request message to the common control entity, where the random access request message includes a random access preamble or a random access procedure message 3;

interacting, by the common control entity, with a radio resource control entity corresponding to the specified air interface, to generate a response message corresponding to the random access request message, and sending the response message to the dedicated control entity, where the response message includes a random access response message or a contention resolution message, and the radio resource control entity is disposed in the radio access device; and sending, by the dedicated control entity, the response message to the terminal through the specified air interface.

When the execution entities of the Media Access Control layer of the radio access device are divided into one common control entity and a dedicated control entity that corresponds to each of at least one type of air interface, this implementation provides an implementation solution of a random access function.

In an eighth possible implementation of the first aspect, the interacting, by the common control entity, with the dedicated control entity corresponding to the specified air interface includes:

receiving, by the dedicated control entity, a random access request message that is sent by the terminal through the specified air interface, where the random access request message includes a random access preamble or a random access procedure message 3;

interacting, by the dedicated control entity by using the common control entity, with a radio resource control entity corresponding to the specified air interface, to generate a response message corresponding to the random access request message, where the response message includes a random access response message or a contention resolution message, and the radio resource control entity is disposed in the radio access device; and sending, by the dedicated control entity, the response message to the terminal through the specified air interface.

When the execution entities of the Media Access Control layer of the radio access device are divided into one common control entity and a dedicated control entity that corresponds to each of at least one type of air interface, this implementation provides another implementation solution of a random access function.

According to a second aspect, a Media Access Control method is provided. The method is applied to a radio access device, the radio access device supports at least two types of air interfaces, the radio access device includes dedicated control entities respectively corresponding to the at least two types of air interfaces, and the method includes:

independently implementing, by each of the dedicated control entities, a Media Access Control function of an air interface corresponding to the dedicated control entity, or interacting with the other of the dedicated control entities respectively corresponding to the at least two types of air interfaces, to implement the Media Access Control function of the air interface.

In the solution of the second aspect, execution entities of a Media Access Control layer of the radio access device are divided into a dedicated control entity corresponding to each of at least one type of air interface, and the dedicated control entity independently or mutually interact to implement a Media Access Control function of the air interface, so that the radio access device in a radio communications system supports a plurality of air interfaces.

In a first possible implementation of the second aspect, the interacting, by each of the dedicated control entities, with the other of the dedicated control entities respectively corresponding to the at least two types of air interfaces includes:

obtaining, by the dedicated control entity, radio condition information of the corresponding air interface; and negotiating, by the dedicated control entity based on the radio condition information of the air interface, with the other of the dedicated control entities respectively corresponding to the at least two types of air interfaces, to determine a radio resource interval corresponding to the air interface, and performing, within the radio resource interval corresponding to the air interface, resource scheduling for data transmitted through the air interface.

When the execution entities of the Media Access Control layer of the radio access device are divided into a dedicated control entity corresponding to each of at least one type of air interface, this implementation provides an implementation solution of a resource scheduling function.

According to a third aspect, an embodiment of this application provides a radio access device. The radio access device supports at least two types of air interfaces, the radio access device communicates with a terminal by using a specified air interface, and the specified air interface is at least one of the at least two types of air interfaces. The radio access device includes dedicated control entities respectively corresponding to the at least two types of air interfaces and a common control entity. The dedicated control entities respectively corresponding to the at least two types of air interfaces and the common control entity are configured to implement the Media Access Control method provided in the first aspect or the various possible implementations of the first aspect.

According to a fourth aspect, an embodiment of this application provides a radio access device. The radio access device supports at least two types of air interfaces, and the radio access device includes dedicated control entities respectively corresponding to the at least two types of air interfaces. The dedicated control entities respectively corresponding to the at least two types of air interfaces are configured to implement the Media Access Control method provided in the second aspect or the various possible implementations of the second aspect.

According to a fifth aspect, an embodiment of this application provides a network device. The network device includes a processor and a memory. The processor is configured to execute a software program stored in the memory, to implement the Media Access Control method provided in the first aspect or the various possible implementations of the first aspect, or the Media Access Control method provided in the second aspect or the various possible implementations of the second aspect.

According to a sixth aspect, an embodiment of this application further provides a computer readable medium. The computer readable medium stores an instruction used to implement the Media Access Control method provided in the first aspect or the first possible implementation of the first aspect, or the computer readable medium stores an instruction used to implement the Media Access Control method provided in the second aspect or the first possible implementation of the second aspect.

DESCRIPTION OF EMBODIMENTS

To make the objectives, technical solutions, and advantages of this application clearer, the following further describes the implementations of this application in detail with reference to the accompanying drawings.

Figure 1:
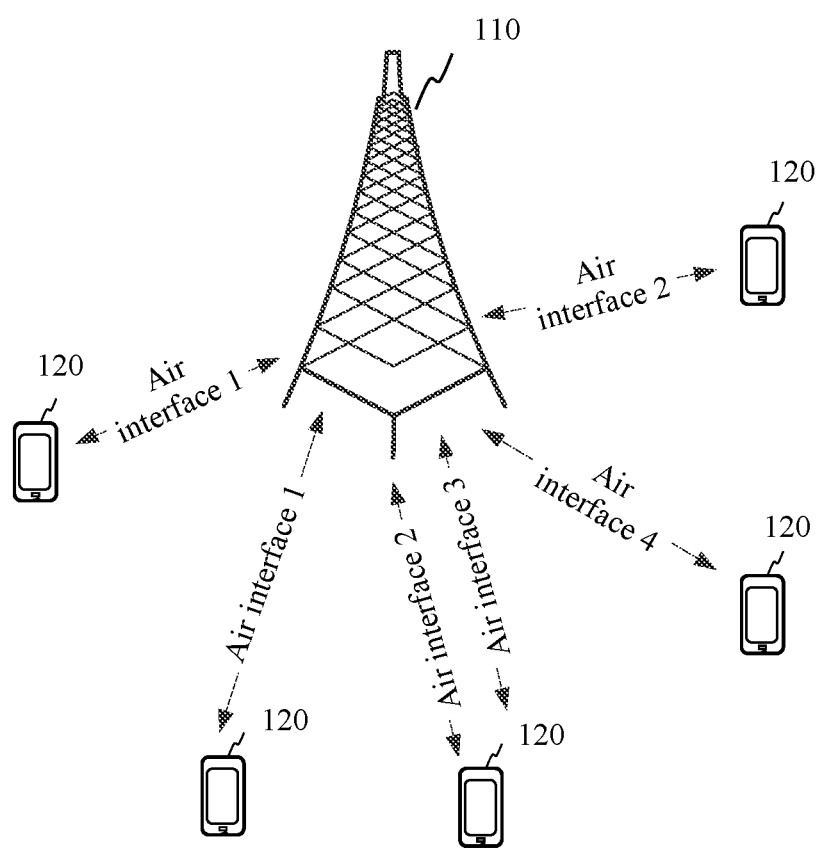
FIG. 1 is an architectural diagram of a network environment according to this application.

FIG. 1 is an architectural diagram of a network environment according to this application. The network environment includes the following network devices: a radio access device 110, and at least one terminal 120 that accesses or is to access the radio access device 110.

To improve radio resource utilization as much as possible while meeting quality of service (English: Quality of Service, QoS) requirements of a plurality of types of radio services in a 5G network, this application proposes an idea that a plurality of air interfaces coexist. To be specific, a radio access device based on one radio access technology supports a plurality of types of air interfaces at the same time, and for radio services that have a relatively large difference in quality of service requirements between the radio access device and a terminal, data transmission may be performed by using different air interfaces.

In this application, the radio access device 110 supports at least two types of air interfaces, and the radio access device 110 communicates with the terminal 120 by using a specified air interface. The specified air interface is at least one of the at least two types of air interfaces supported by the radio access device 110, and each type of air interface is responsible for transmitting one type of radio service or a plurality of types of radio services having relatively similar quality of service requirements between the radio access device 110 and the terminal 120. In the embodiments of this application, one type of air interface may correspond to only one air interface, or one type of air interface may correspond to two or more air interfaces.

The terminal 120 in this application may include a handheld device, an in-vehicle device, a wearable device, or a computing device that has a radio communication function; another processing device connected to a wireless modem; or user equipment (English: User Equipment, UE for short), a mobile station (English: Mobile Station, MS for short), a terminal (Terminal), terminal equipment (Terminal Equipment), a soft terminal, and the like that are in various forms. For ease of description, in this application, the devices mentioned above are collectively referred to as a terminal or UE.

The radio access device 110 may be an independent base station, for example, a macro base station, a micro base station, or a picocell base station. Alternatively, the radio access device 110 may be a distributed base station included in a cloud radio access network. Alternatively, the radio access device 110 may be a wireless router.

Figure 2:
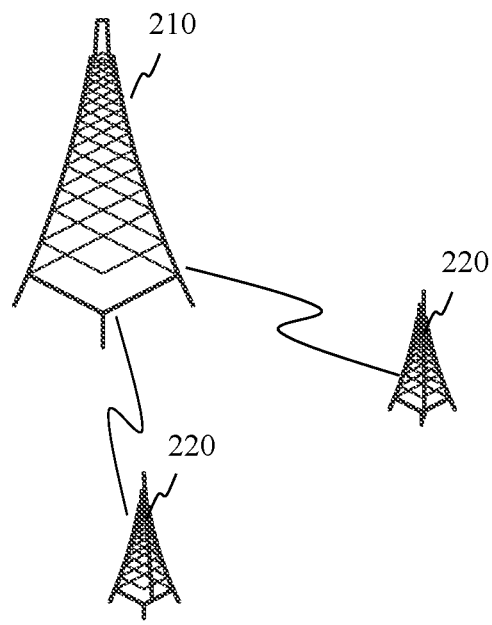
FIG. 2 is a schematic structural diagram of a distributed base station in an implementation environment shown in FIG. 1.

For example, the radio access device 110 in the network environment shown in FIG. 1 is a distributed base station. FIG. 2 is a schematic structural diagram of a distributed base station according to an embodiment of this application. The distributed base station includes a base band unit 210 (English: Base Band Unit, BBU) and at least one radio access point 220 (English: radio access point, RAP). The at least one radio access point 220 is also referred to as a remote radio head (English: Remote Radio Head, RRH) of the distributed base station. The base band unit 210 and the radio access point 220 are connected by using a common public radio interface (English: common public radio interface, CPRI).

Figure 3:
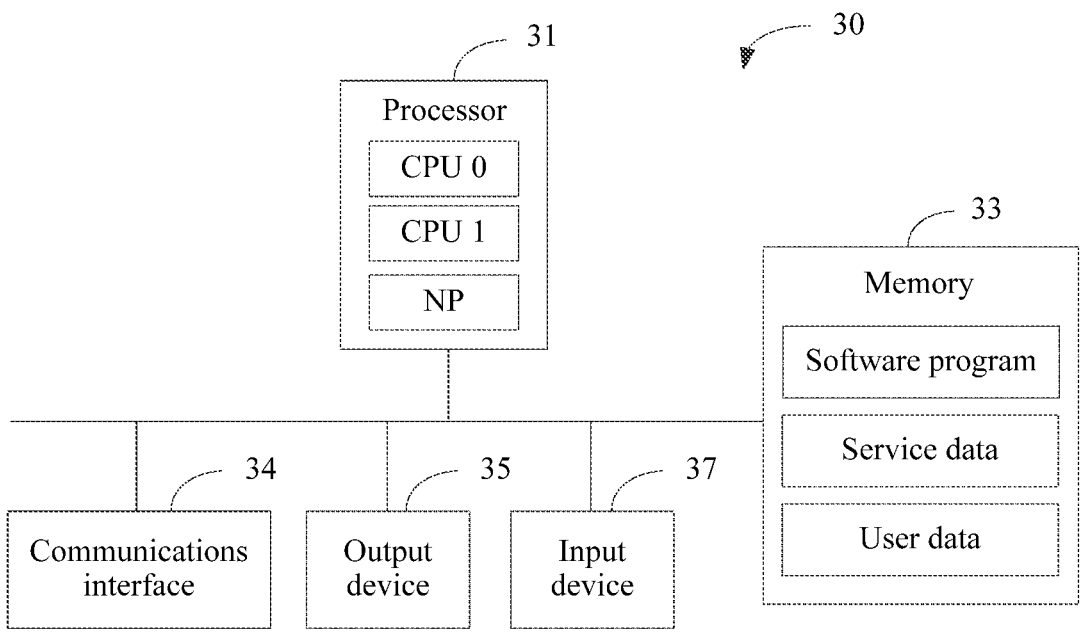
FIG. 3 is a schematic structural diagram of a network device according to an embodiment of this application.

FIG. 3 is a schematic structural diagram of a network device 30 according to an embodiment of this application. The network device 30 may be independently implemented as the base band unit 210 or the radio access point 220 in the distributed base station corresponding to FIG. 2. As shown in FIG. 3, the network device 30 may include a processor 31 and a communications interface 34.

The processor 31 may include one or more processing units, and the processing unit may be a central processing unit (English: central processing unit, CPU), a network processor (English: network processor, NP), or the like. The processor 31 is configured to perform scheduling and processing on an association message (an association request or a reassociation request) sent by a terminal.

The communications interface 34 may include a wired network interface such as an Ethernet interface or a fiber interface, or may include a radio network interface such as a cellular mobile network interface. For example, when the network device 30 is implemented as the base band unit 210 in the distributed base station corresponding to FIG. 2, the communications interface 34 may include an Ethernet interface that is configured to connect to an upper layer network, and a fiber interface that is configured to connect to the radio access point 220 in the distributed base station. When the network device 30 is implemented as the radio access point 220 in the distributed base station corresponding to FIG. 2, the communications interface 34 may include a fiber interface that is configured to connect to the base band unit 210 in the distributed base station, and a cellular mobile network interface that is configured to connect to the terminal. The communications interface 34 is controlled by the processor 31.

Optionally, the network device 30 may further include a memory 33. The processor 31 may be connected to the memory 33 and the communications interface 34 by using a bus.

The memory 33 may be configured to store a software program, and the software program may be executed by the processor 31. In addition, the memory 33 may further store various types of service data or user data.

Optionally, the network device 30 may further include an output device 35 and an input device 37. The output device 35 and the input device 37 are connected to the processor 31. The output device 35 may be a display configured to display information, a power amplifier device configured to play back voice, a printer, or the like. The output device 35 may further include an output controller configured to provide output to the display, the power amplifier device, or the printer. The input device 37 may be a device used by a user to enter information, for example, a mouse, a keyboard, an electronic stylus, or a touch panel. The input device 37 may further include an output controller that is configured to receive and process input from the device such as the mouse, the keyboard, the electronic stylus, or the touch panel.

In a possible implementation, Media Access Control MAC entities corresponding to at least two types of air interfaces in a radio access device may include dedicated control entities respectively corresponding to the at least two types of air interfaces and one common control entity. For any one of the dedicated control entities respectively corresponding to the at least two types of air interfaces, the common control entity interacts with the dedicated control entity to implement a Media Access Control function. Media Access Control functions may include resource scheduling (including semi-static configuration and dynamic allocation of radio resources between different air interfaces and resource allocation of a specific air interface), multiplexing/demultiplexing, priority processing, a hybrid automatic repeat request (English: hybrid automatic retransmission request, HARQ), random access control, and the like. The dedicated control entity may interact with the common control entity to implement one of the Media Access Control functions, or may interact with the common control entity to implement a plurality of functions in the Media Access Control functions. For example, when a dedicated control entity interacts with the common control entity to merely implement a HARQ process, the dedicated control entity may be referred to as a HARQ entity.

Specifically, for example, the radio access device is a distributed base station including a BBU and at least one RAP. FIG. 4 to FIG. 8 are five schematic diagrams of distribution of a common control entity and dedicated control entities in a distributed base station. As shown in FIG. 4 to FIG. 8, one cell of the distributed base station supports at least two types of air interfaces (only an air interface 1 and an air interface 2 are shown in the figure). In addition to Media Access Control MAC entities, each type of air interface corresponds to a radio resource control (English: radio resource control, RRC) entity, a Packet Data Convergence Protocol (English: Packet Data Convergence Protocol, PDCP) entity, a radio link control (English: Radio Link Control, RLC) entity, and a physical layer (English: Physical Layer, PHY).

Figure 4:
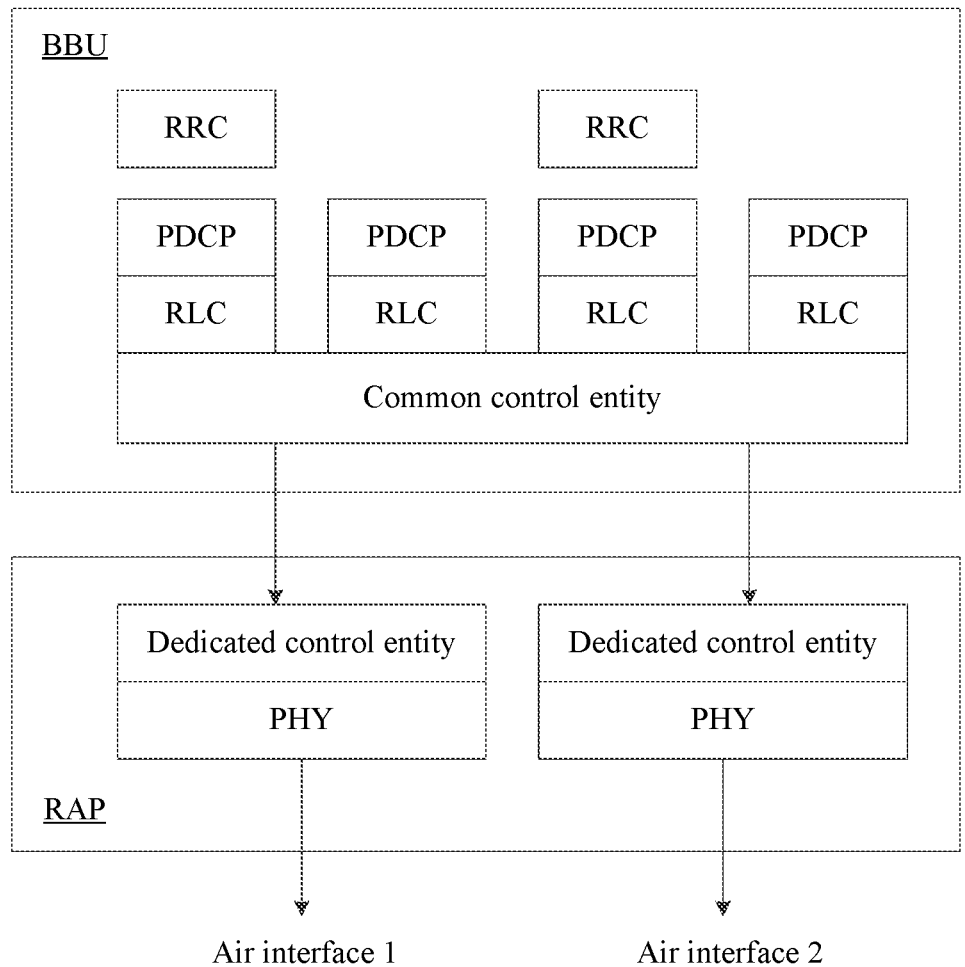
FIG. 4 to FIG. 8 are five schematic diagrams of distribution of a common control entity and dedicated control entities in a distributed base station.

In FIG. 4, a common control entity, a radio resource control entity corresponding to each type of air interface, a Packet Data Convergence Protocol corresponding to each type of air interface, and a radio link control entity corresponding to each type of air interface are disposed in a BBU, and a dedicated control entity corresponding to each type of air interface and a physical layer corresponding to each type of air interface are disposed in each RAP.

Figure 5:
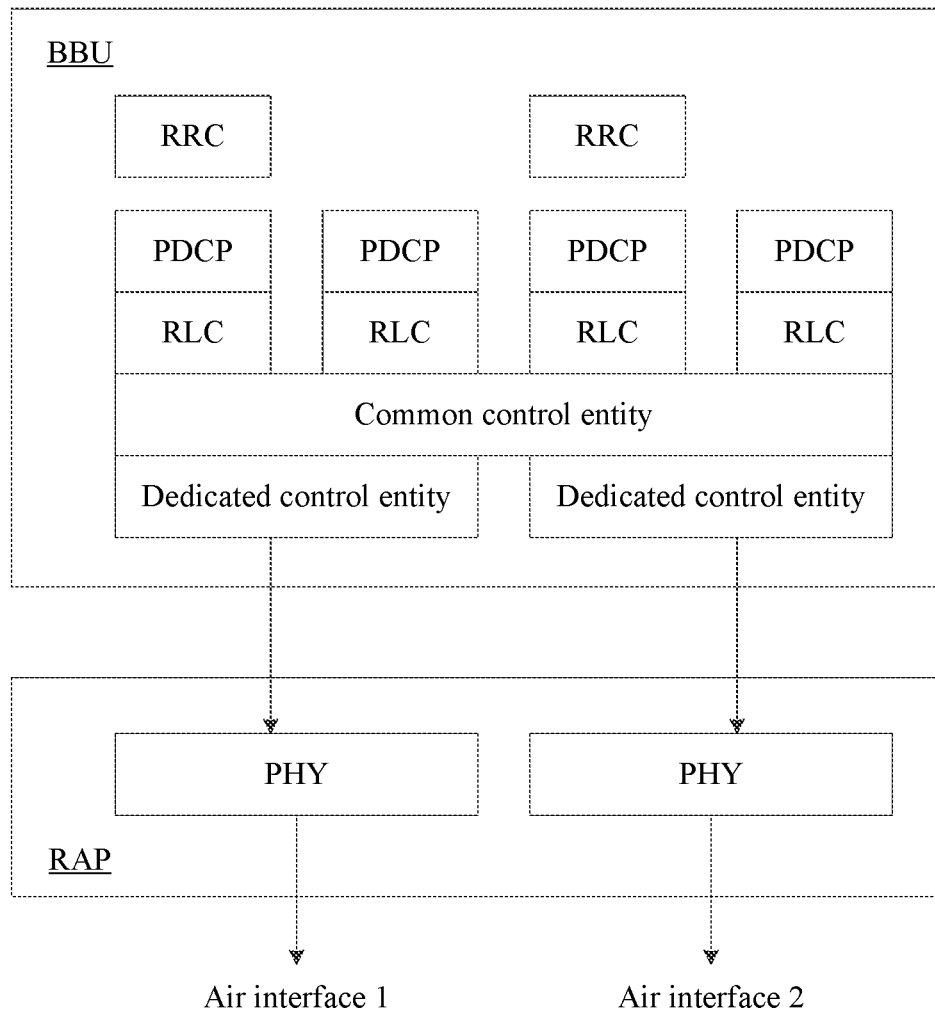

In FIG. 5, a common control entity, a radio resource control entity corresponding to each type of air interface, a Packet Data Convergence Protocol corresponding to each type of air interface, a radio link control entity corresponding to each type of air interface, and a dedicated control entity corresponding to each type of air interface are disposed in a BBU, and a physical layer corresponding to each type of air interface is disposed in each RAP.

Figure 6:
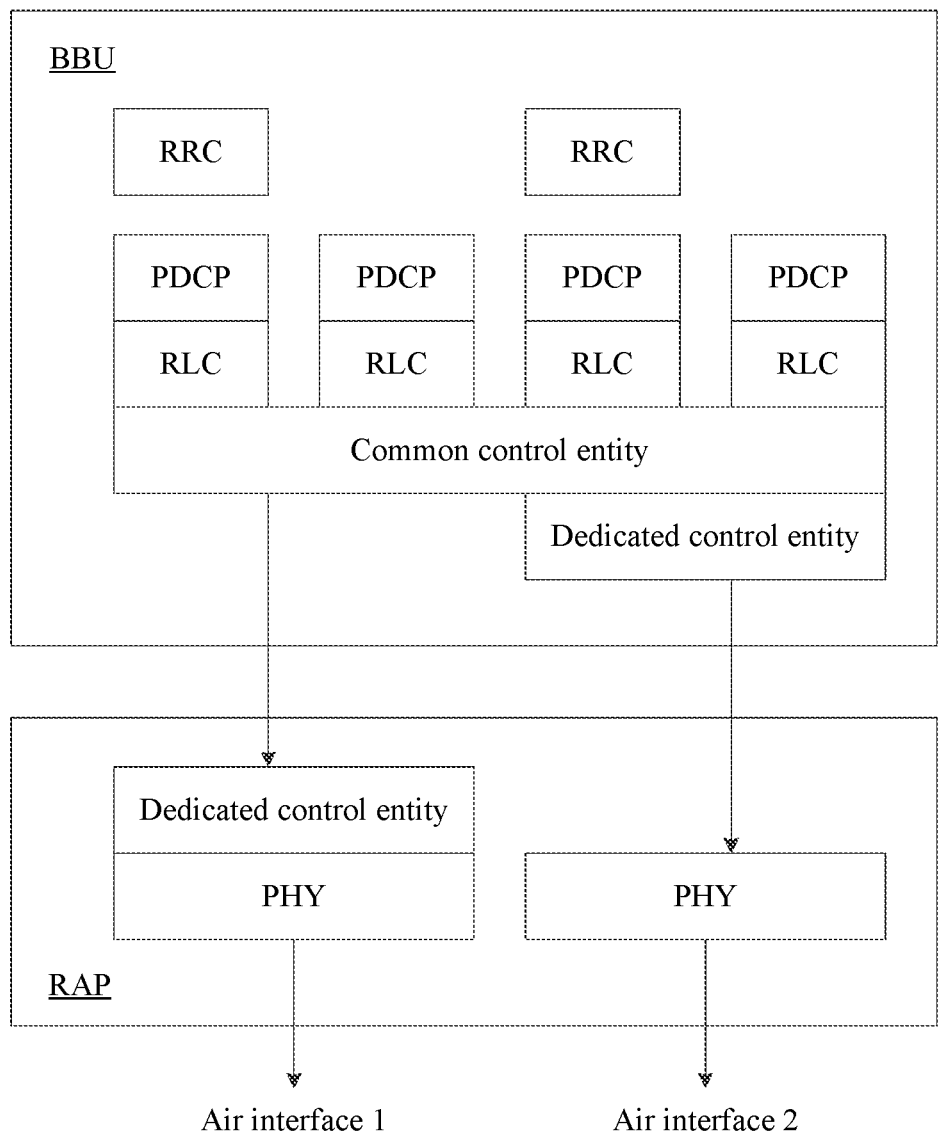

In FIG. 6, a common control entity, a radio resource control entity corresponding to each type of air interface, a Packet Data Convergence Protocol corresponding to each type of air interface, a radio link control entity corresponding to each type of air interface, and dedicated control entities corresponding to some air interfaces (an air interface 1) are disposed in a BBU, and dedicated control entities corresponding to the other air interfaces (an air interface 2) and a physical layer corresponding to each type of air interface are disposed in each RAP.

Figure 7:
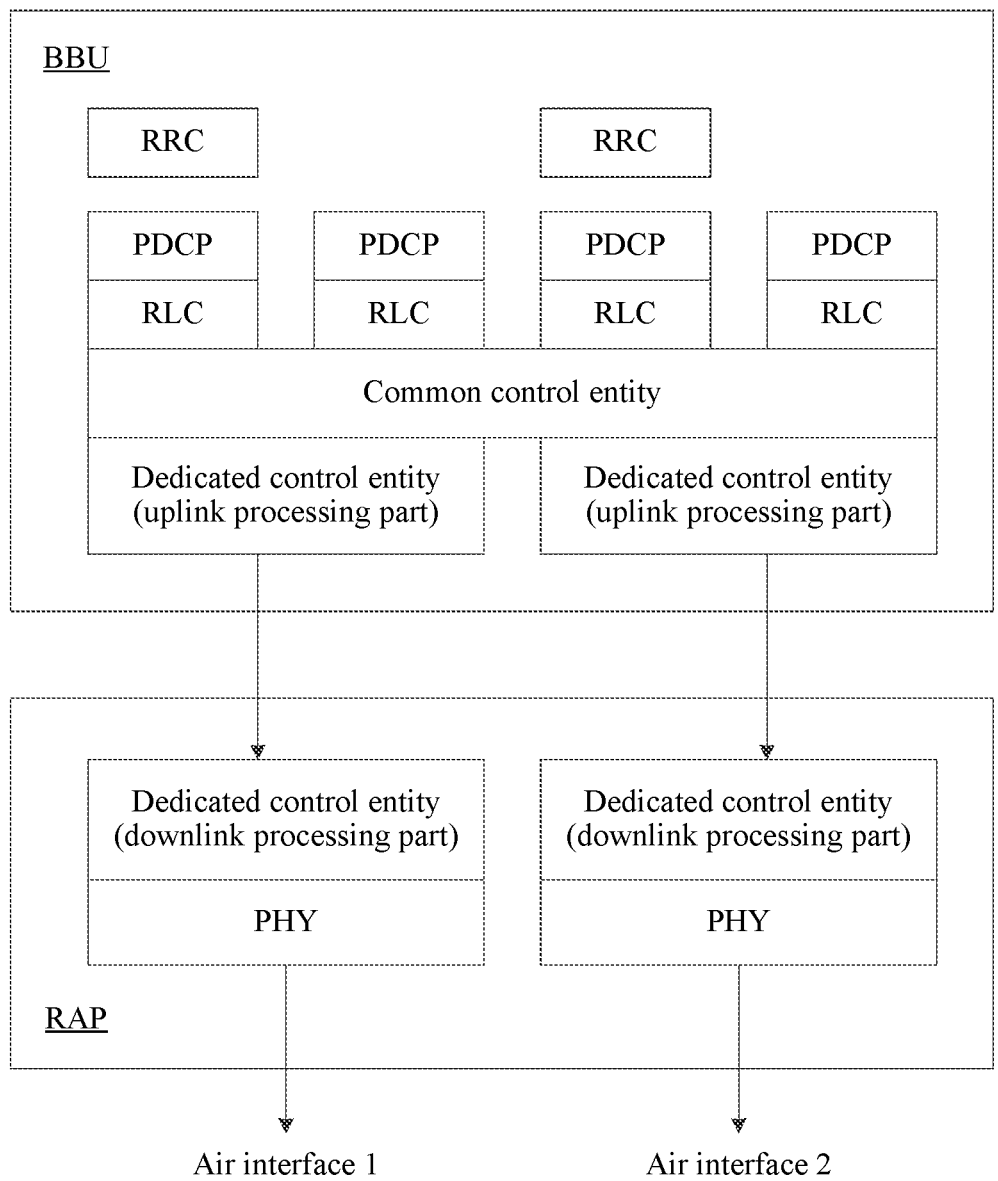

In FIG. 7, a common control entity, a radio resource control entity corresponding to each type of air interface, a Packet Data Convergence Protocol corresponding to each type of air interface, a radio link control entity corresponding to each type of air interface, and an uplink processing part of dedicated control entities corresponding to various types of air interfaces are disposed in a BBU, and a downlink processing part of the dedicated control entities corresponding to the various types of air interfaces is disposed in a RAP. An uplink processing part of a dedicated control entity is a part responsible for processing an uplink service in the dedicated control entity. Similarly, a downlink processing part of the dedicated control entity is a part responsible for processing a downlink service in the dedicated control entity.

Figure 8:
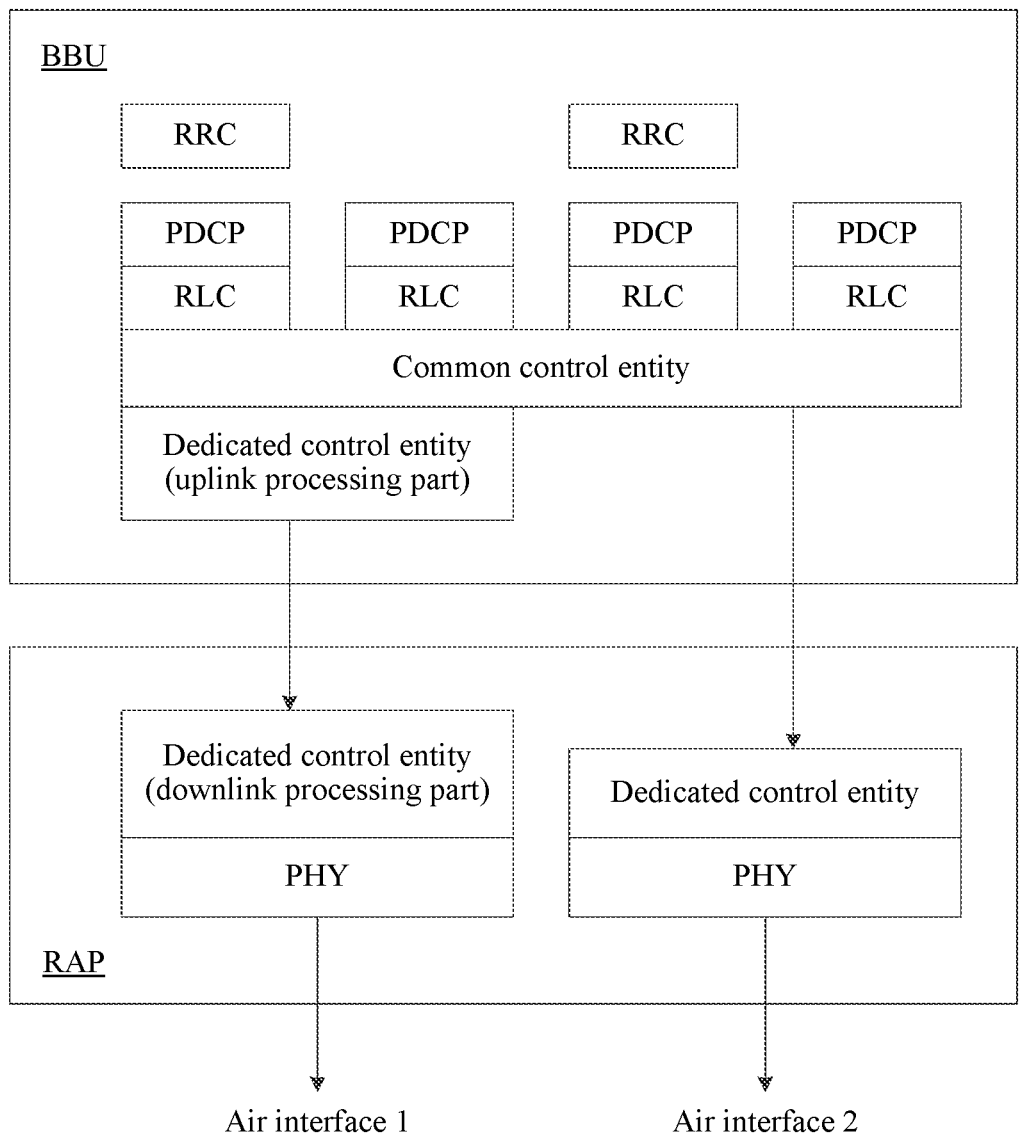

In FIG. 8, a common control entity, a radio resource control entity corresponding to each type of air interface, a Packet Data Convergence Protocol corresponding to each type of air interface, a radio link control entity corresponding to each type of air interface, and an uplink processing part of some (a dedicated control entity corresponding to an air interface 1) of dedicated control entities corresponding to various types of air interfaces are disposed in a BBU, and a downlink processing part of the some dedicated control entities (the dedicated control entity corresponding to the air interface 1) and the other (a dedicated control entity corresponding to an air interface 2) of the dedicated control entities corresponding to the various types of air interfaces are disposed in a RAP.

In the solution shown in any one of FIG. 4 to FIG. 8, the common control entity or the dedicated control entity may be implemented by a processor in the corresponding BBU or RAP by executing a corresponding software program.

In the solutions shown in FIG. 4 to FIG. 8, execution entities of a Media Access Control MAC layer of the radio access device are divided into one common control entity and a dedicated control entity that corresponds to each of at least one type of air interface, and the common control entity may interact with a dedicated control entity corresponding to any air interface to implement Media Access Control on a service transmitted through the air interface, so that the radio access device in a radio communications system supports a plurality of air interfaces. For a specific process in which the common control entity interacts with the dedicated control entity to implement a Media Access Control function, refer to descriptions in the following embodiment corresponding to FIG. 9.

Figure 9:
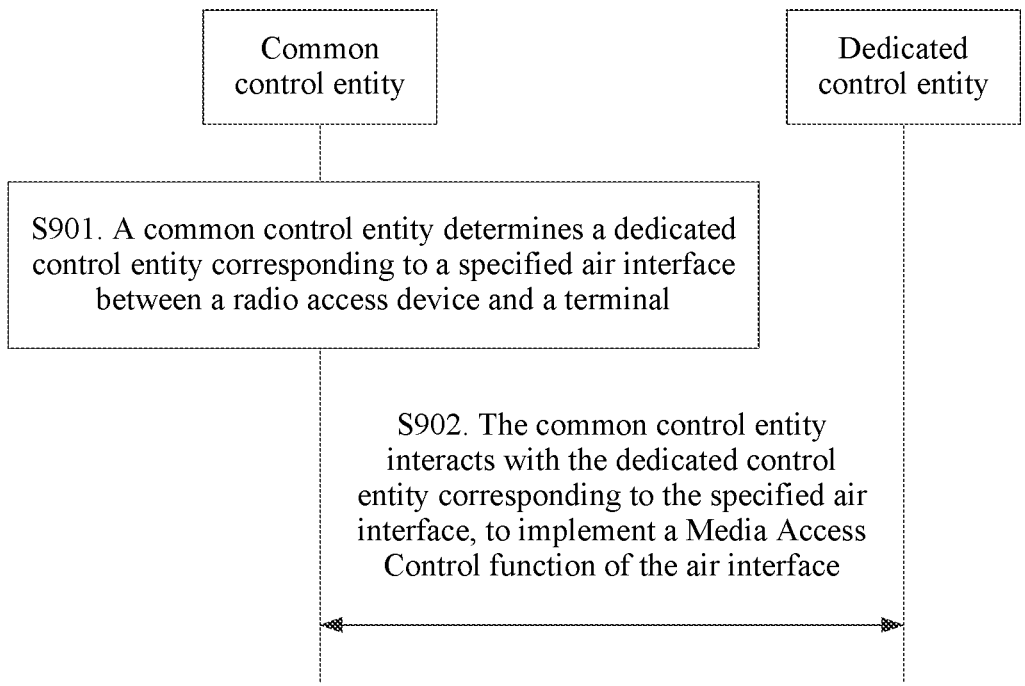
FIG. 9 is a flowchart of a Media Access Control method according to an embodiment of this application.
Figure 10:
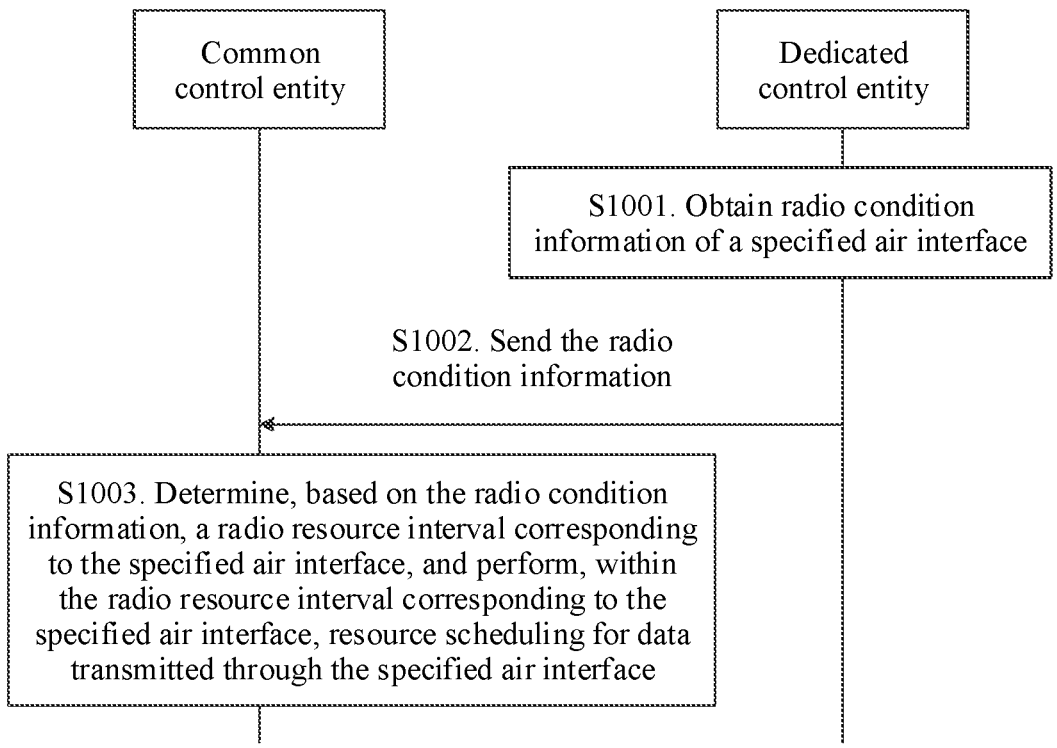
FIG. 10 is a flowchart of a resource allocation method in the embodiment shown in FIG. 9.

FIG. 9 is a flowchart of a Media Access Control method according to an embodiment of this application. The method may be applied to the radio access device 110 in the implementation environment shown in FIG. 1. The radio access device supports at least two types of air interfaces, the at least two types of air interfaces correspond to a same radio interface protocol, and the radio access device includes dedicated control entities respectively corresponding to the at least two types of air interfaces and a common control entity. As shown in FIG. 10, the method includes the following steps.

Step 901: The common control entity determines a dedicated control entity corresponding to a specified air interface between the radio access device and a terminal.

In this embodiment of this application, the dedicated control entities corresponding to various types of air interfaces and the common control entity in the radio access device may be implemented by a processor in the radio access device by executing a preset software program (for example, the software program may be stored in a memory of the radio access device).

In this embodiment of this application, the corresponding dedicated control entities are pre-designed for the various types of air interfaces, and the common control entity may determine the dedicated control entity corresponding to the specified air interface between the radio access device and the terminal by using the following two methods:

When the radio access device initiates communication to the terminal, the common control entity determines, based on a service requirement of a communication service and design characteristics of the various types of air interfaces, an air interface satisfying the service requirement as the specified air interface, and further determines the dedicated control entity corresponding to the specified air interface.

When the terminal initiates communication to the radio access device, the common control entity may determine an air interface receiving communication service data as the specified air interface, and determine the dedicated control entity corresponding to the specified air interface.

Step 902: The common control entity interacts with the dedicated control entity corresponding to the specified air interface, to implement a Media Access Control function of the air interface.

In the embodiments of this application, the interaction step is separately described in detail by using functions such as resource allocation, multiplexing/demultiplexing, an uplink/downlink HARQ, and random access control as examples.

1. Interaction Process Between the Common Control Entity and the Dedicated Control Entity Corresponding to the Specified Air Interface During Resource Allocation FIG. 10 is a flowchart of a resource allocation method according to an embodiment of this application. In the method, a common control entity is responsible for resource allocation between various types of air interfaces and resource scheduling within each type of air interface. As shown in FIG. 10, the resource allocation method may include the following steps.

Step 1001: A dedicated control entity obtains radio condition information of a specified air interface.

The dedicated control entity corresponding to the specified air interface may measure and obtain the radio condition information of the air interface by using a physical layer corresponding to the specified air interface, for example, a channel quality indicator (English: Channel Quality Indicator, CQI), a signal-to-noise ratio (English: Signal Noise Ratio, SNR), or a signal to interference plus noise ratio (English: signal to noise plus interference power ratio, SINR).

Step 1002: The dedicated control entity corresponding to the specified air interface sends the radio condition information to the common control entity, and the common control entity receives the radio condition information.

Step 1003: The common control entity determines, based on the radio condition information, a radio resource interval corresponding to the specified air interface, and performs, within the radio resource interval corresponding to the specified air interface, resource scheduling for data transmitted through the specified air interface.

The common control entity may obtain radio condition information corresponding to the various types of air interfaces, and determine, based on the radio condition information corresponding to the various types of air interfaces, radio resource intervals that may be respectively used by the various types of air interfaces.

In this embodiment of this application, the radio resource interval may be a frequency interval of a radio resource, and the radio resource interval that can be used by the specified air interface is a frequency band in which data can be transmitted on the specified air interface.

In this embodiment of this application, when determining, based on the radio condition information, the radio resource interval corresponding to the specified air interface, the common control entity may determine a frequency interval within which a radio condition (for example, a CQI/SNR/SINR) corresponding to the specified air interface is optimal as the radio resource interval corresponding to the specified air interface.

Alternatively, the common control entity may allocate the respective radio resource intervals to the various types of air interfaces with reference to design characteristics of the various types of air interfaces and radio conditions of the various types of air interfaces. A design characteristic of an air interface may indicate a service requirement of service data transmitted on the air interface. For example, the common control entity may preferentially allocate, based on the design characteristics of the various types of air interfaces, a radio resource interval to an air interface having a highest service requirement (for example, a frequency interval within which a radio condition corresponding to the air interface having the highest service requirement is optimal as the radio resource interval corresponding to the air interface), then allocate a radio resource interval in remaining radio resource intervals to an air interface having a second highest service requirement, and by analogy until allocation is performed for all air interfaces.

For any type of air interface, for example, a specified air interface between a radio access device and a terminal, the common control entity may further perform resource scheduling for data transmitted through the specified air interface, for example, schedule a resource used to send data or signaling to the terminal through the specified air interface, and generate, for the terminal connected to the radio access device, downlink control information (English: Downlink Control Information, DCI) used to send data or signaling on the specified air interface. The common control entity notifies a dedicated control entity corresponding to the specified air interface of a scheduling result. The dedicated control entity performs downlink control processing based on the scheduling result, and sends the downlink control information to a physical layer. The physical layer processes the downlink control information, and sends the processed downlink control information to the terminal.

Optionally, the common control entity may perform, with reference to uplink/downlink buffer information of the various types of air interfaces, resource scheduling for data transmitted through the various types of air interfaces. The uplink/downlink buffer information of the various types of air interfaces may be jointly maintained by the common control entity, or uplink/downlink buffer information corresponding to each type of air interface may be maintained by a dedicated control entity corresponding to the air interface. In the method, when each dedicated control entity maintains uplink/downlink buffer information of a corresponding air interface, the dedicated control entity may notify the common control entity of the uplink/downlink buffer information of the air interface.

Figure 11:
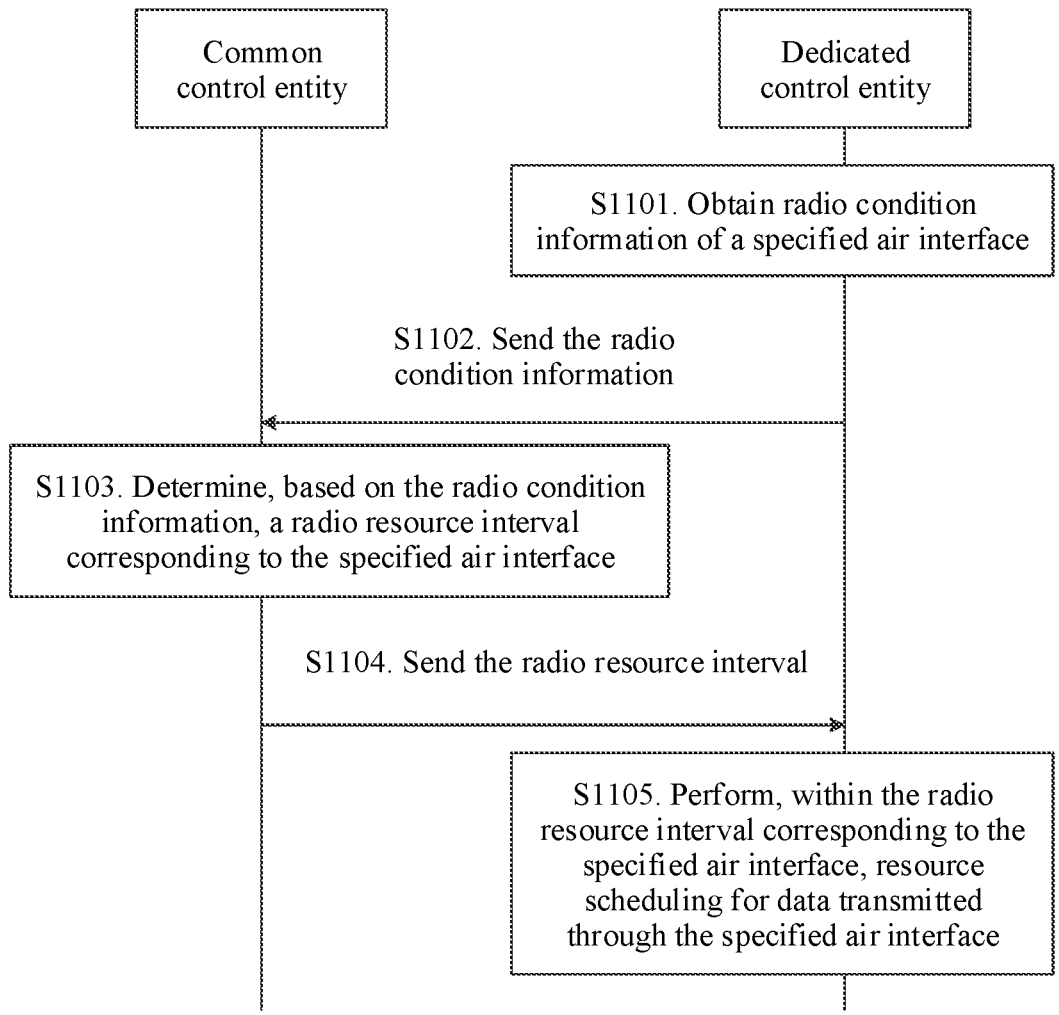
FIG. 11 is a flowchart of another resource allocation method in the embodiment shown in FIG. 9.
Figure 12:
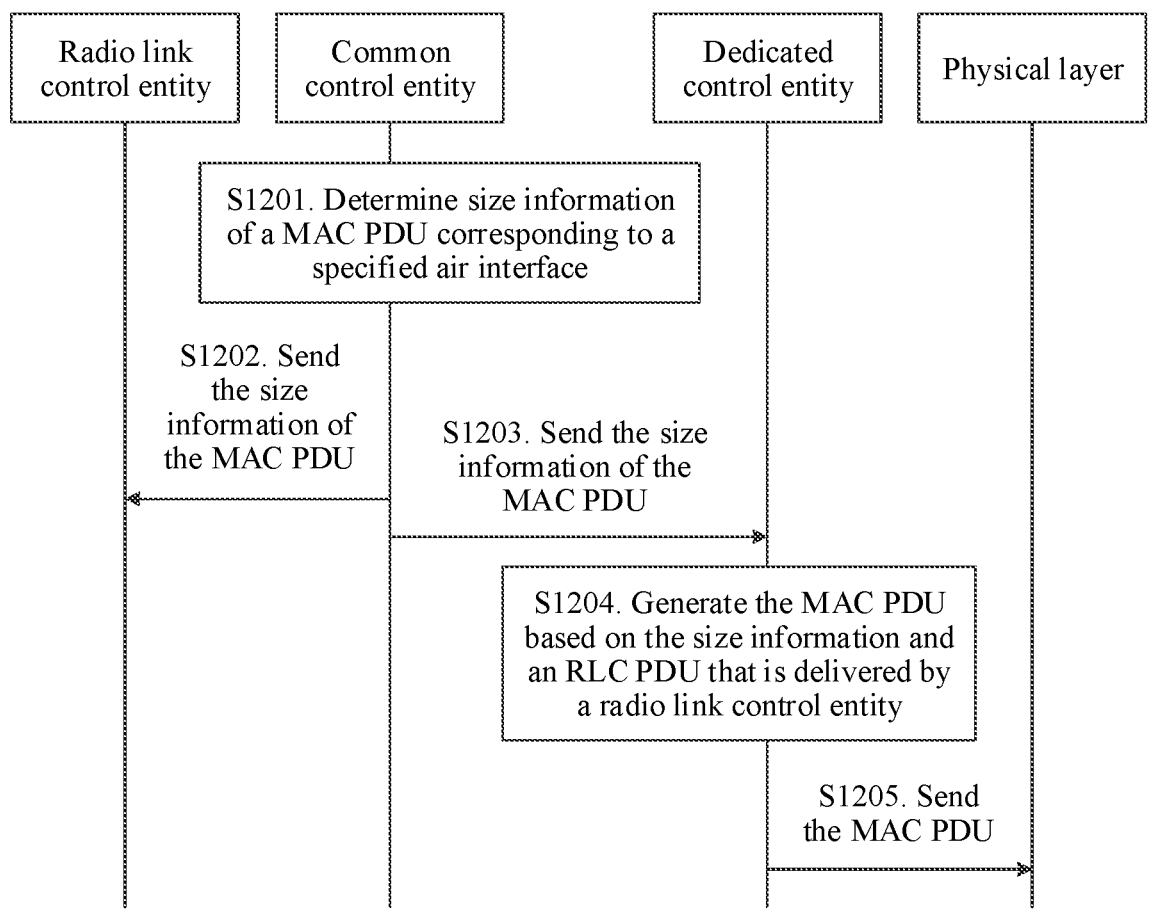
FIG. 12 is a flowchart of a multiplexing method in the embodiment shown in FIG. 9.

FIG. 11 is a flowchart of another resource allocation method according to an embodiment of this application. In the method, a common control entity is responsible for resource allocation between various types of air interfaces, and a dedicated control entity is responsible for resource scheduling within an air interface corresponding to the dedicated control entity. As shown in FIG. 12, the resource allocation method may include the following steps.

Step 1101: A dedicated control entity obtains radio condition information of a specified air interface.

Step 1102: The dedicated control entity sends the radio condition information to the common control entity, and the common control entity receives the radio condition information.

Step 1103: The common control entity determines, based on the radio condition information, a radio resource interval corresponding to the specified air interface.

Step 1104: The common control entity sends the radio resource interval corresponding to the specified air interface to the dedicated control entity, and the dedicated control entity receives the radio resource interval corresponding to the specified air interface.

Step 1105: The dedicated control entity performs, within the radio resource interval corresponding to the specified air interface, resource scheduling for data transmitted through the specified air interface.

Different from the method corresponding to FIG. 10, in this method, after determining, based on radio condition information corresponding to the various types of air interfaces, radio resource intervals that can be respectively used by the various types of air interfaces, the common control entity notifies dedicated control entities corresponding to the various types of air interfaces of the radio resource intervals that can be respectively used by the various types of air interfaces. For any dedicated control entity, the common control entity may schedule a resource used to send data or signaling to a terminal through an air interface corresponding to the dedicated control entity, and generate, for the terminal connected to a radio access device, downlink control information used to send data or signaling on the air interface.

Similarly, a dedicated control entity may perform, with reference to uplink/downlink buffer information of a corresponding air interface, resource scheduling for data transmitted through the corresponding air interface. When the uplink/downlink buffer information of the corresponding air interface is jointly maintained by the common control entity, the common control entity may notify the dedicated control entity of the uplink/downlink buffer information of the corresponding air interface.

2. Interaction Process Between the Common Control Entity and a Dedicated Control Entity Corresponding to One Type of Air Interface During Multiplexing FIG. 12 is a flowchart of a multiplexing method according to an embodiment of this application. As shown in FIG. 12, the multiplexing method may include the following steps.

Step 1201: A common control entity determines size information of a Media Access Control protocol data unit (English: MAC Packet Data Unit, MAC PDU) corresponding to a specified air interface.

The common control entity may determine, based on a status of performing resource scheduling for data transmitted through the specified air interface, the size information of the MAC PDU corresponding to the specified air interface.

Step 1202: The common control entity sends the size information to a dedicated control entity corresponding to the specified air interface and a radio link control entity corresponding to the specified air interface, and the dedicated control entity and the radio link control entity corresponding to the specified air interface receive the size information.

The radio link control entity is disposed in a radio access device.

Step 1203: The common control entity sends, to the dedicated control entity, a radio link control protocol data unit RLC PDU delivered by the radio link control entity, and the dedicated control entity receives the radio link control protocol data unit.

Step 1204: The dedicated control entity generates the Media Access Control protocol data unit based on the size information and the radio link control protocol data unit that is delivered by the radio link control entity.

Step 1205: The dedicated control entity sends the Media Access Control protocol data unit to a physical layer corresponding to the specified air interface.

Figure 13:
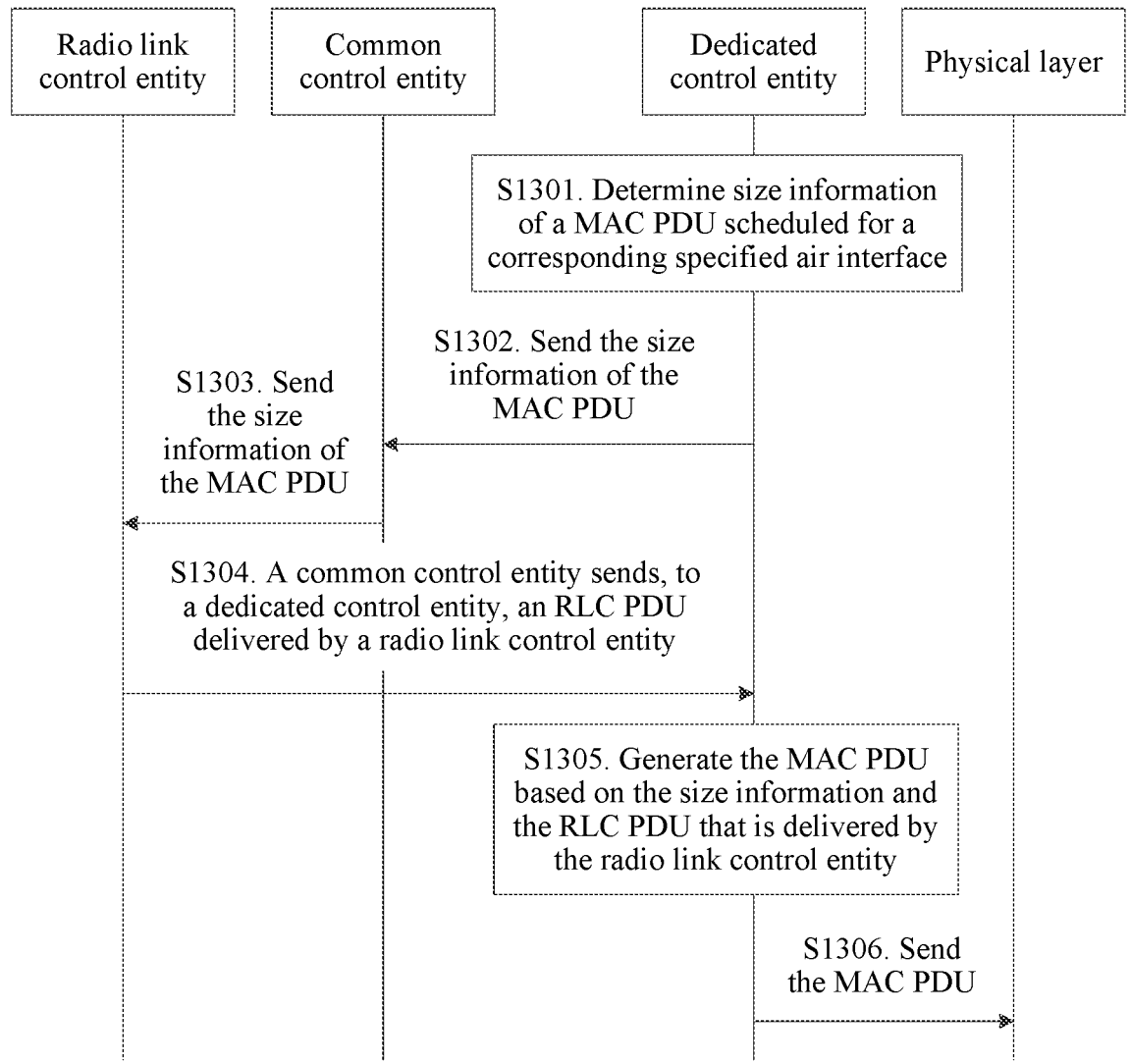
FIG. 13 is a flowchart of another multiplexing method in the embodiment shown in FIG. 9.

FIG. 13 is a flowchart of another multiplexing method according to an embodiment of this application. As shown in FIG. 13, the multiplexing method may include the following steps.

Step 1301: A dedicated control entity determines size information of a Media Access Control protocol data unit scheduled for a corresponding specified air interface.

Step 1302: The dedicated control entity sends the size information to a common control entity, and the common control entity receives the size information.

Step 1303: The common control entity sends the size information to a radio link control entity corresponding to the specified air interface, and the radio link control entity receives the size information.

Step 1304: The common control entity sends, to the dedicated control entity, a radio link control protocol data unit delivered by the radio link control entity, and the dedicated control entity receives the radio link control protocol data unit.

Step 1305: The dedicated control entity generates the Media Access Control protocol data unit based on the size information and the radio link control protocol data unit that is delivered by the radio link control entity.

Step 1306: The dedicated control entity sends the Media Access Control protocol data unit to a physical layer corresponding to the specified air interface.

Optionally, in this solution, the dedicated control entity may further determine, based on RRC configuration or a dynamic scheduling decision, a service bearer that needs to be scheduled, or the common control entity may determine a service bearer that needs to be scheduled.

Figure 14:
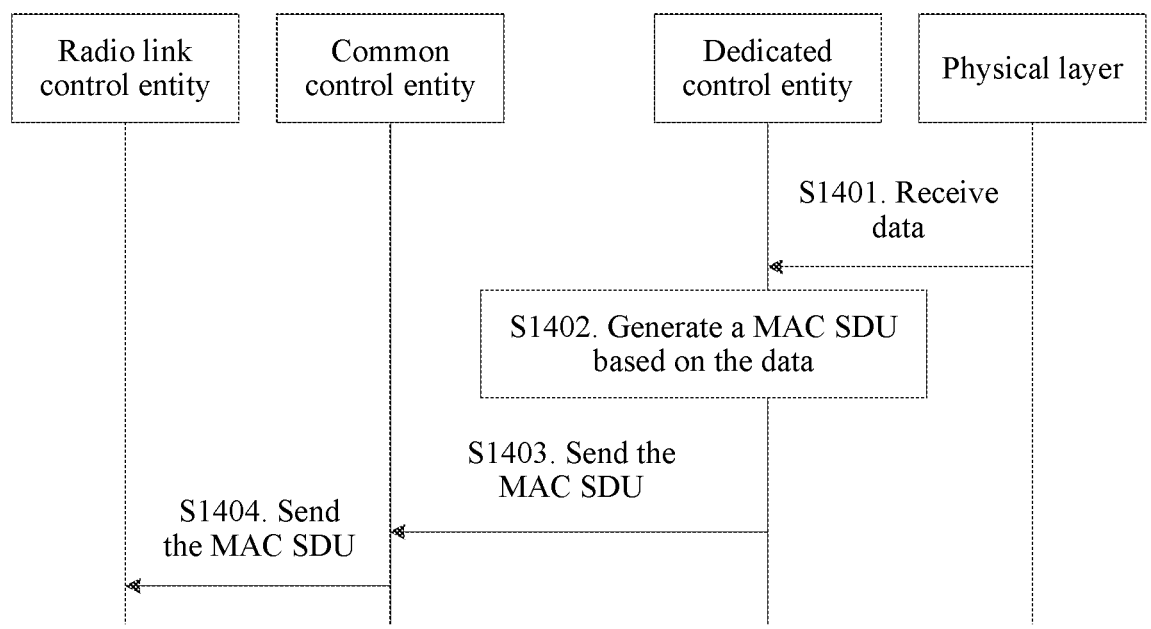
FIG. 14 is a flowchart of a demultiplexing method in the embodiment shown in FIG. 9.

3. Interaction Process Between the Common Control Entity and the Dedicated Control Entity Corresponding to the Specified Air Interface During Demultiplexing FIG. 14 is a flowchart of a demultiplexing method according to an embodiment of this application. As shown in FIG. 14, the demultiplexing method may include the following steps.

Step 1401: A dedicated control entity receives data sent by a physical layer of a corresponding specified air interface.

Step 1402: The dedicated control entity generates a Media Access Control service data unit based on the data.

Step 1403: The dedicated control entity sends the Media Access Control service data unit to a common control entity, and the common control entity receives the Media Access Control service data unit.

Step 1404: The common control entity sends the Media Access Control service data unit to a radio link control entity corresponding to the specified air interface.

Figure 15:
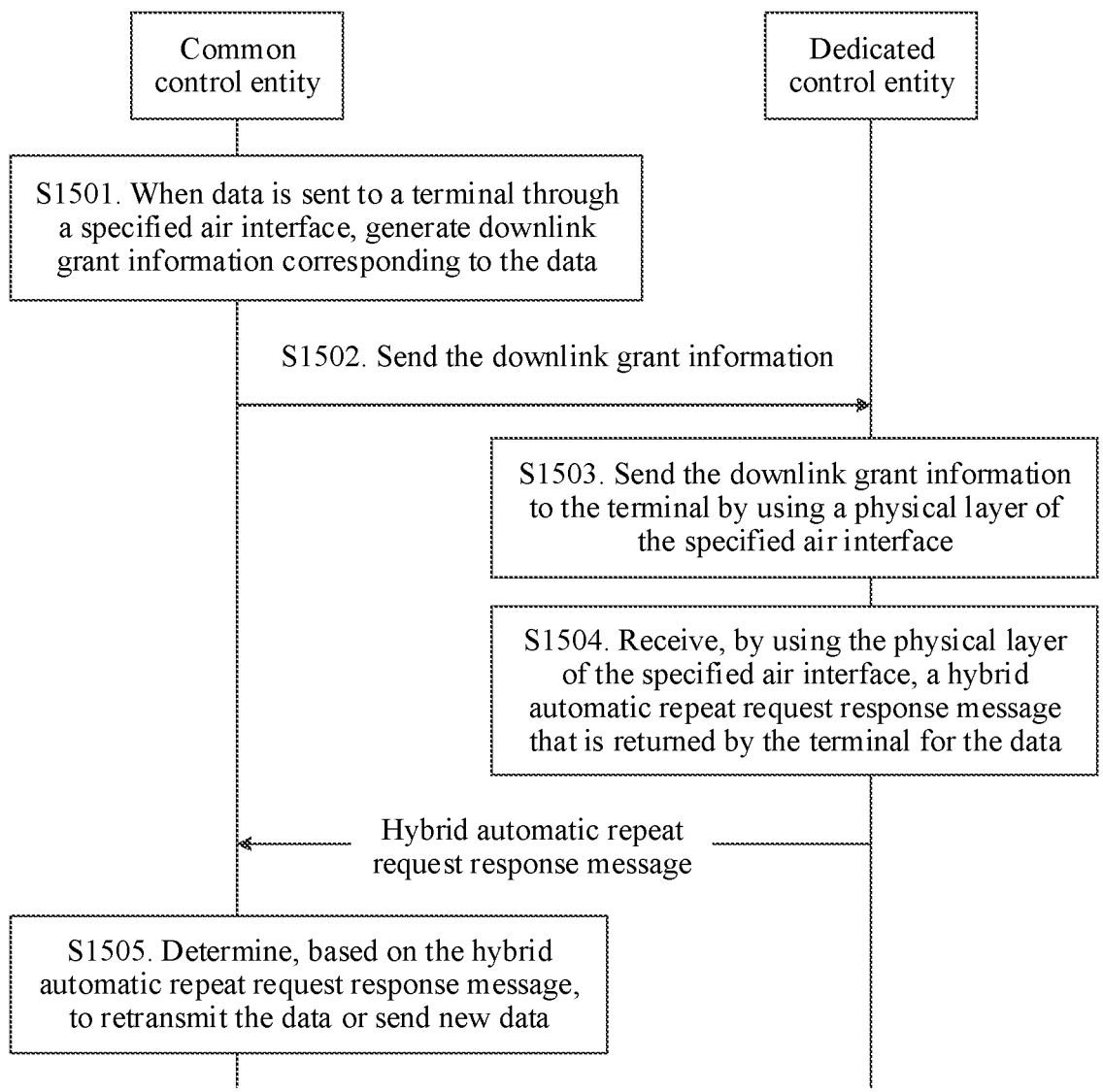
FIG. 15 is a flowchart of a downlink HARQ control method in the embodiment shown in FIG. 9.

4. Interaction Process Between the Common Control Entity and the Dedicated Control Entity Corresponding to the Specified Air Interface During a Downlink HARQ FIG. 15 is a flowchart of a downlink HARQ control method according to an embodiment of this application. As shown in FIG. 15, the downlink HARQ control method may include the following steps.

Step 1501: When a radio access device sends data to a terminal through a specified air interface, a common control entity generates downlink grant information corresponding to the data.

Step 1502: The common control entity transmits the downlink grant information (DL assignment) to a dedicated control entity.

The downlink grant information may be HARQ information, including information such as a new data indicator (English: new data indicator, NDI), a transport block (English: transport block, TB) size, and a HARQ process identifier (HARQ process ID).

Step 1503: The dedicated control entity sends the downlink grant information to the terminal by using a physical layer of the specified air interface.

Step 1504: The dedicated control entity receives, by using the physical layer of the specified air interface, a hybrid automatic repeat request response message that is returned by the terminal for the data, and sends the hybrid automatic repeat request response message to the common control entity.

The hybrid automatic repeat request response message is an ACK/NACK.

Step 1505: The common control entity determines, based on the hybrid automatic repeat request response message, to retransmit the data or send new data.

The common control entity determines, based on the hybrid automatic repeat request response message, to schedule new transmission or retransmit a HARQ redundancy version (English: redundancy version, RV), and generate new downlink grant information.

Figure 16:
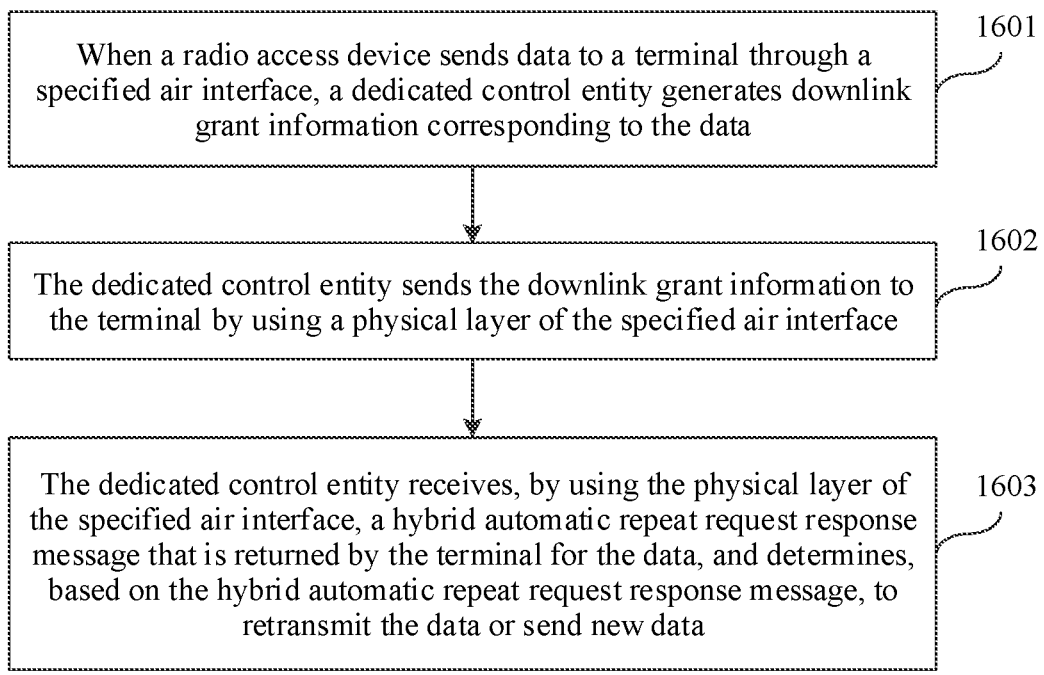
FIG. 16 is a flowchart of another downlink HARQ control method in the embodiment shown in FIG. 9.

FIG. 16 is a flowchart of another downlink HARQ control method according to an embodiment of this application. As shown in FIG. 16, the downlink HARQ control method may include the following steps.

Step 1601: When a radio access device sends data to a terminal through a specified air interface, a dedicated control entity generates downlink grant information corresponding to the data.

Step 1602: The dedicated control entity sends the downlink grant information to the terminal by using a physical layer of the specified air interface.

Step 1603: The dedicated control entity receives, by using the physical layer of the specified air interface, a hybrid automatic repeat request response message that is returned by the terminal for the data, and determines, based on the hybrid automatic repeat request response message, to retransmit the data or send new data.

Figure 17:
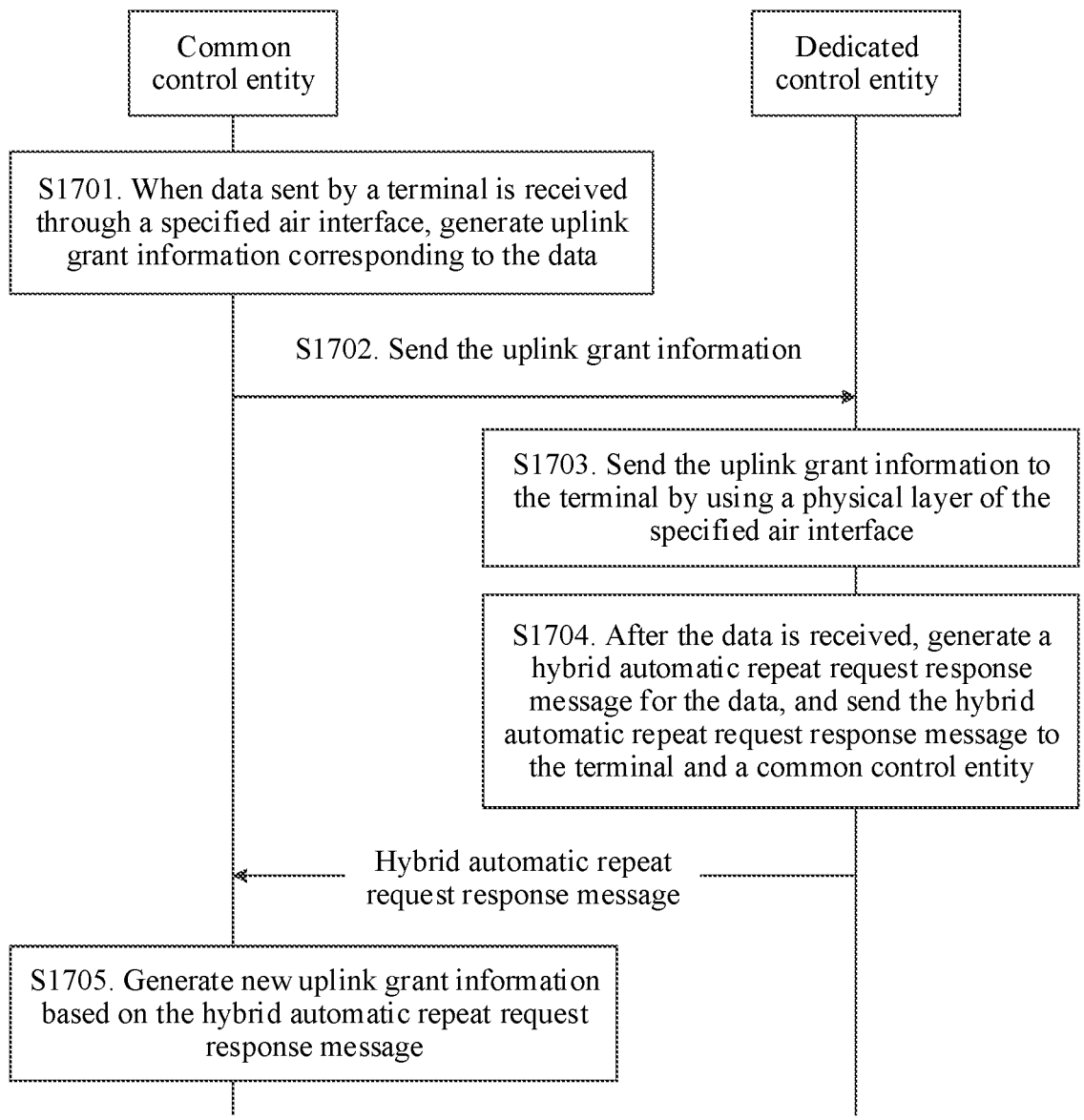
FIG. 17 is a flowchart of an uplink HARQ control method in the embodiment shown in FIG. 9.

5. Interaction Process Between the Common Control Entity and the Dedicated Control Entity Corresponding to the Specified Air Interface During an Uplink HARQ FIG. 17 is a flowchart of an uplink HARQ control method according to an embodiment of this application. As shown in FIG. 17, the uplink HARQ control method may include the following steps.

Step 1701: When a radio access device receives, through a specified air interface, data sent by a terminal, a common control entity generates uplink grant information corresponding to the data.

Step 1702: The common control entity transmits the uplink grant information to a dedicated control entity.

Step 1703: The dedicated control entity sends the uplink grant information to the terminal by using a physical layer of the specified air interface.

Step 1704: After the data is received, the dedicated control entity generates a hybrid automatic repeat request response message for the data, and sends the hybrid automatic repeat request response message to the terminal and the common control entity.

Step 1705: The common control entity generates new uplink grant information based on the hybrid automatic repeat request response message.

In this solution, the common control entity indicates the uplink grant (UL grant) information such as HARQ information including information such as a new data indicator, a transport block size, and a redundancy version to the dedicated control entity, and the dedicated control entity processes the information by using the physical layer and indicates the processed information to UE. The UE sends, by using a specified time-frequency resource location, an uplink data packet to the PHY corresponding to the air interface. After successfully decoding the uplink data packet, the PHY layer corresponding to the air interface sends a MAC PDU to the corresponding dedicated control entity, and the dedicated control entity sends the MAC PDU to the common control entity. The dedicated control entity generates a HARQ ACK/NACK, sends the HARQ ACK/NACK to the UE, and indicates the HARQ ACK/NACK message to the common control entity. The common control entity determines, based on the HARQ ACK/NACK message, to schedule new transmission or retransmit a HARQ redundancy version. The common control entity sends new downlink grant information to the dedicated control entity.

Figure 18:
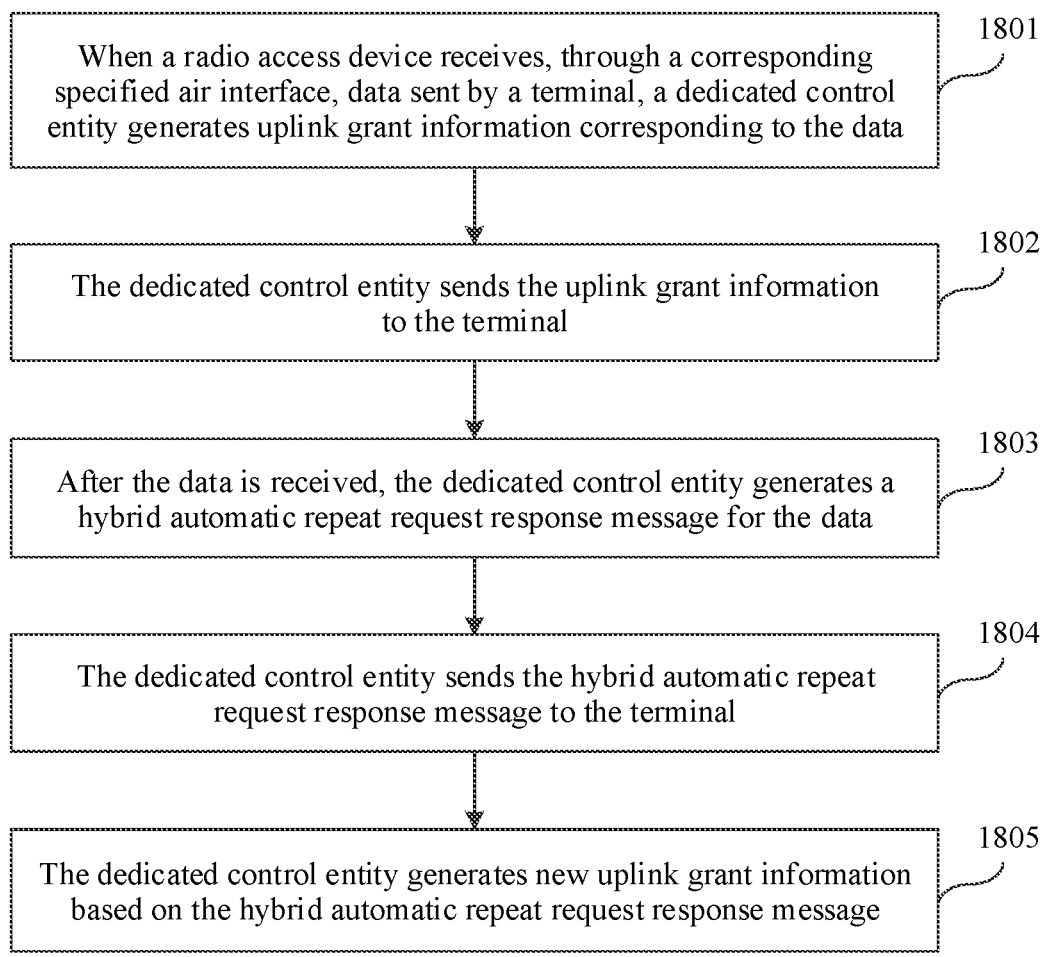
FIG. 18 is a flowchart of another uplink HARQ control method in the embodiment shown in FIG. 9.

FIG. 18 is a flowchart of another uplink HARQ control method according to an embodiment of this application. As shown in FIG. 18, the uplink HARQ control method may include the following steps.

Step 1801: When a radio access device receives, through a corresponding specified air interface, data sent by a terminal, a dedicated control entity generates uplink grant information corresponding to the data.

Step 1802: The dedicated control entity sends the uplink grant information to the terminal.

Step 1803: After the data is received, the dedicated control entity generates a hybrid automatic repeat request response message for the data.

Step 1804: The dedicated control entity sends the hybrid automatic repeat request response message to the terminal.

Step 1805: The dedicated control entity generates new uplink grant information based on the hybrid automatic repeat request response message.

Figure 19:
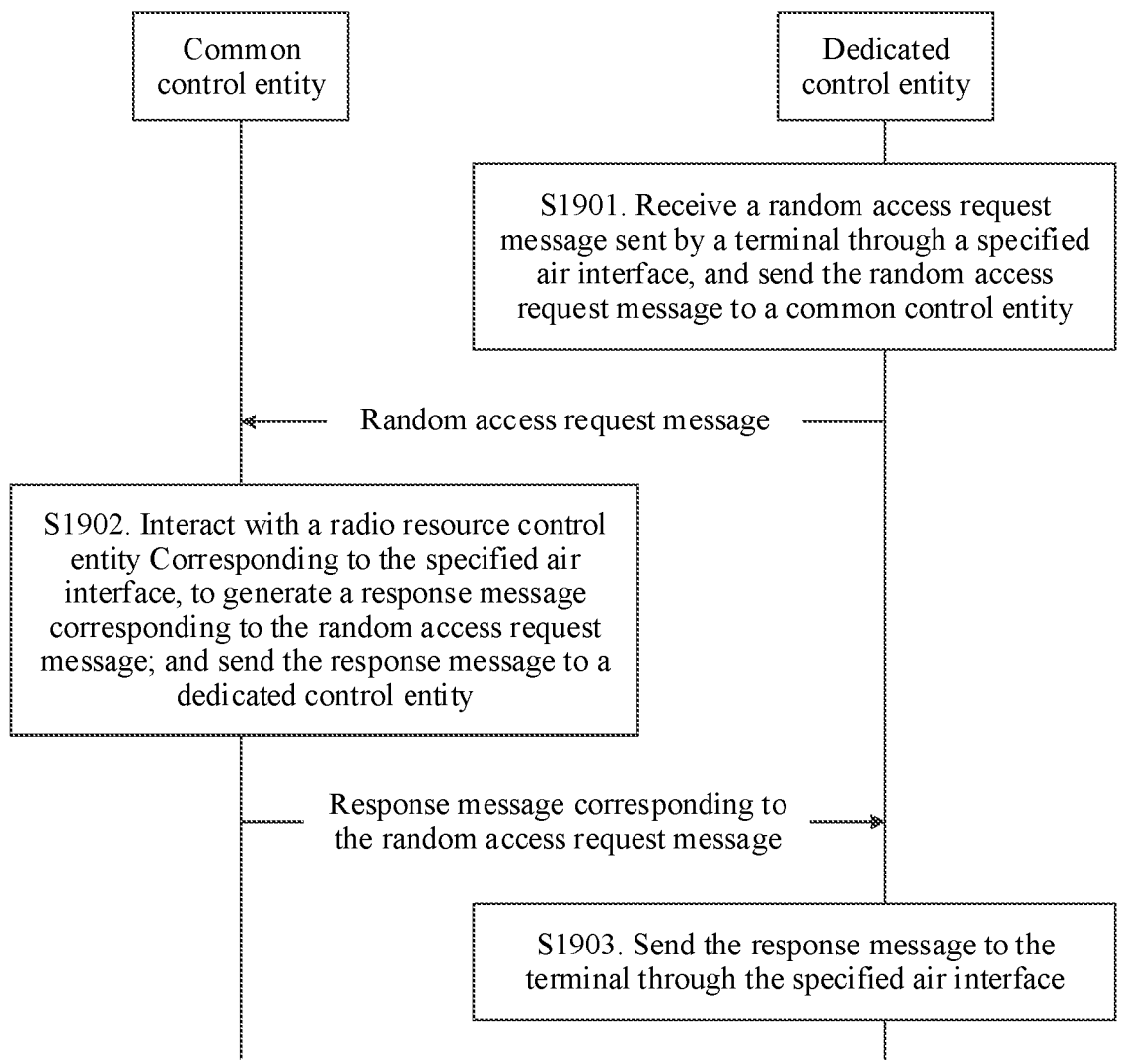
FIG. 19 is a flowchart of a random access control method in the embodiment shown in FIG. 9.

6. Interaction Process Between the Common Control Entity and the Dedicated Control Entity Corresponding to the Specified Air Interface During Random Access Control FIG. 19 is a flowchart of a random access control method according to an embodiment of this application. As shown in FIG. 19, the random access control method may include the following steps.

Step 1901: A dedicated control entity receives a random access request message that is sent by a terminal through a specified air interface, and sends the random access request message to a common control entity, where the random access request message includes a random access preamble or a random access procedure message 3.

Step 1902: The common control entity interacts with a radio resource control entity corresponding to the specified air interface, to generate a response message corresponding to the random access request message, and sends the response message to the dedicated control entity, where the response message includes a random access response message or a contention resolution message.

The radio resource control entity is disposed in a radio access device.

Step 1903: The dedicated control entity sends the response message to the terminal through the specified air interface.

In this method, assume that no distinguishing is performed between air interfaces in a random access process of UE, and the UE accesses a network by using a common frequency interval, a common air interface, or a default air interface. In this case, a MAC layer-related function module in the random access process is located in the common control entity, a physical layer of a corresponding air interface interacts with the common control entity to perform the random access process, and a dedicated control entity of the corresponding air interface transparently transmits a message. For example, the radio access device is a distributed base station, and a specific process is as follows:

1. UE sends a random access preamble (preamble) to a radio access network.

2. A RAP of the radio access network receives and detects, by using a physical layer of a default air interface, the preamble sent by the UE, the RAP instructs a common MAC layer of a BBU to generate a random access response (English: random access response, RAR) message, the BBU sends the RAR to the RAP, and the RAP sends the RAR to the UE.

3. The UE sends a random access procedure message 3 (msg 3) including UE identifier information to the radio access network, where the message may further include a radio resource control connection request (RRC Connection Request) message. An RRU receives the message of the UE, and sends the message to the BBU.

4. The common MAC layer of the BBU interacts with an RRC layer to generate a random access contention resolution message, where the message may further include a radio resource control connection setup message; the BBU sends the message to the RAP; and the RAP sends the message to the UE, to complete a random access process.

Figure 20:
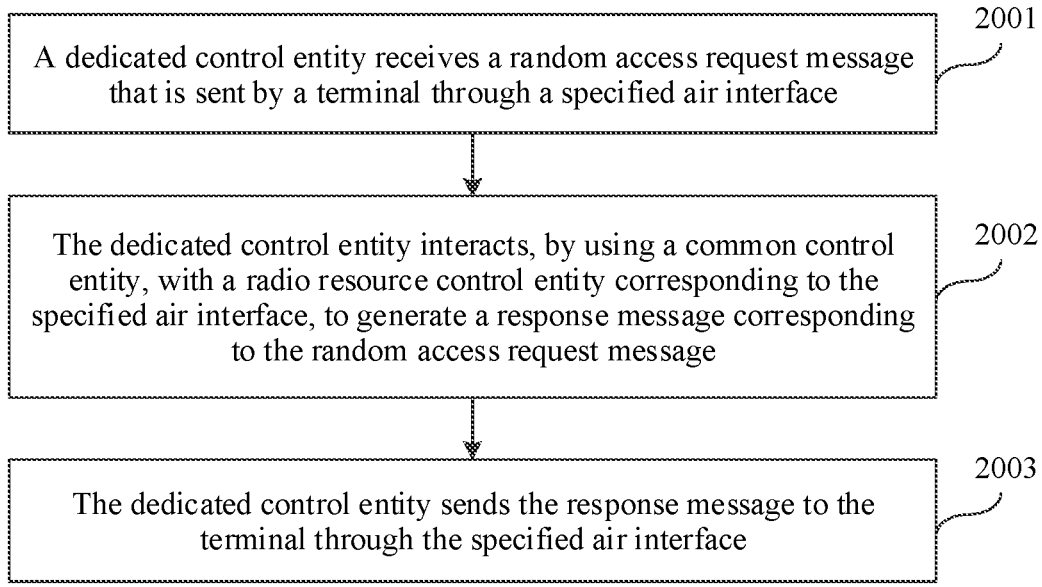
FIG. 20 is a flowchart of another random access control method in the embodiment shown in FIG. 9.

FIG. 20 is a flowchart of another random access control method according to an embodiment of this application. As shown in FIG. 20, the random access control method may include the following steps.

Step 2001: A dedicated control entity receives a random access request message that is sent by a terminal through a specified air interface, where the random access request message includes a random access preamble or a random access procedure message 3.

Step 2002: The dedicated control entity interacts, by using a common control entity, with a radio resource control entity corresponding to the specified air interface, to generate a response message corresponding to the random access request message, where the response message includes a random access response message or a contention resolution message.

Step 2003: The dedicated control entity sends the response message to the terminal through the specified air interface.

In this case, a MAC layer-related function module in a random access process is located in a dedicated control entity corresponding to a specified air interface, a physical layer of the specified air interface interacts with the dedicated control entity of the specified air interface to perform the random access process, and the common control entity transparently transmits a message (for example, the common control entity interacts with an RRC layer).

A specific process is similar to the manner shown in FIG. 19, and a difference lies in that:

In this method, the dedicated control entity of the specified air interface directly generates the RAR and sends the RAR to the UE, without participation of the common control entity. Step 3) and step 4) still need participation of the common control entity. The common control entity interacts with the RRC layer, and the contention resolution message may be generated by the dedicated control entity or the common control entity.

In conclusion, in the Media Access Control method in this embodiment of this application, the dedicated control entities corresponding to the various types of air interfaces and the common control entity are configured in the radio access device that supports the at least two types of air interfaces in one cell, and the common control entity interacts with the dedicated control entities corresponding to the various types of air interfaces to implement various Media Access Control functions, so as to implement flexible multi-air interface resource allocation, so that a network architecture can support coexistence of a plurality of air interfaces, thereby better adapting to quality of service requirements of diversified services, improving spectrum utilization, and reducing fronthaul link costs.

In another possible implementation, Media Access Control MAC entities corresponding to at least two types of air interfaces in a radio access device may include dedicated control entities respectively corresponding to the at least two types of air interfaces. The dedicated control entities respectively corresponding to the at least two types of air interfaces may interact with each other to implement Media Access Control functions, or may independently implement a Media Access Control function. The Media Access Control function may include resource scheduling (including semi-static configuration and dynamic allocation of radio resources between different air interfaces and resource allocation of a specific air interface), multiplexing/demultiplexing, priority processing, a hybrid automatic repeat request, random access control, and the like. For example, the dedicated control entities respectively corresponding to the at least two types of air interfaces may interact with each other to implement a resource scheduling function, and other functions such as multiplexing/demultiplexing, priority processing, a hybrid automatic repeat request, and random access control may be independently implemented by any dedicated control entity.

Specifically, for example, the radio access device is a distributed base station including a BBU and at least one RAP. FIG. 21 to FIG. 24 are four schematic diagrams of distribution of dedicated control entities in a distributed base station. As shown in FIG. 21 to FIG. 24, one cell of the distributed base station supports at least two types of air interfaces (only an air interface 1 and an air interface 2 are shown in the figures).

Figure 21:
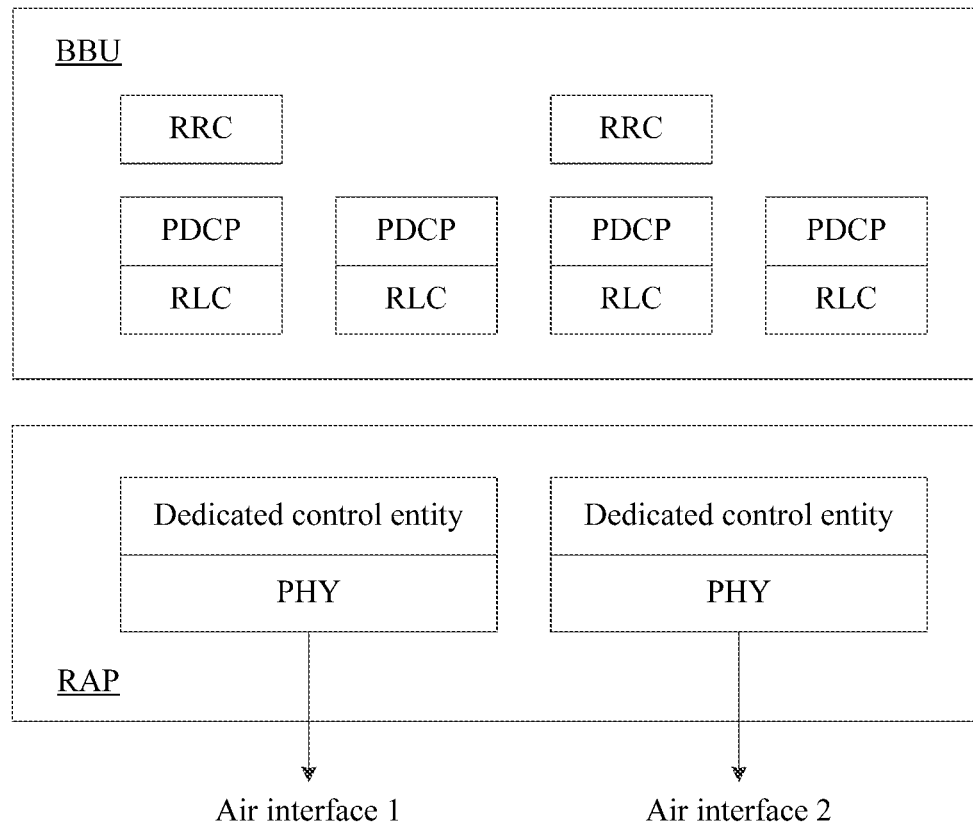
FIG. 21 to FIG. 24 are four schematic diagrams of distribution of dedicated control entities in a distributed base station.

In FIG. 21, a radio resource control entity corresponding to each type of air interface, a Packet Data Convergence Protocol corresponding to each type of air interface, and a radio link control entity corresponding to each type of air interface are disposed in a BBU, and a dedicated control entity corresponding to each type of air interface and a physical layer corresponding to each type of air interface are disposed in each RAP.

Figure 22:
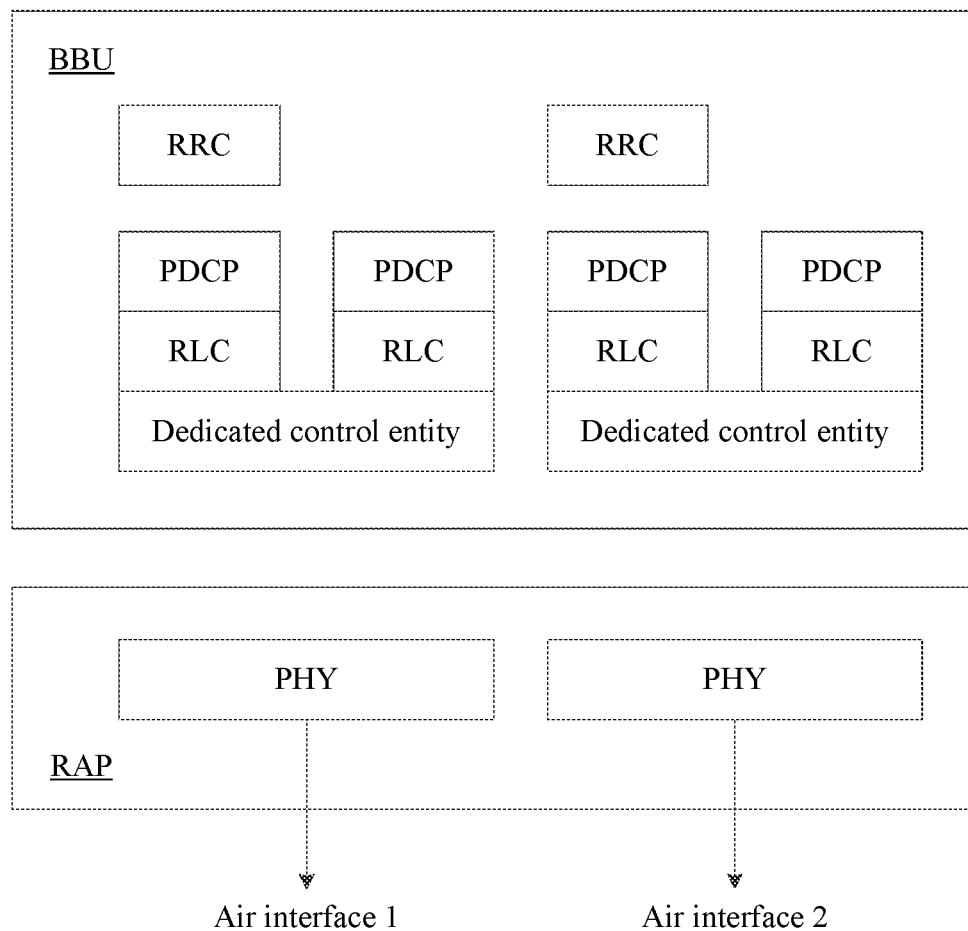

In FIG. 22, a radio resource control entity corresponding to each type of air interface, a Packet Data Convergence Protocol corresponding to each type of air interface, a radio link control entity corresponding to each type of air interface, and a dedicated control entity corresponding to each type of air interface are disposed in a BBU, and a physical layer corresponding to each type of air interface is disposed in each RAP.

Figure 23:
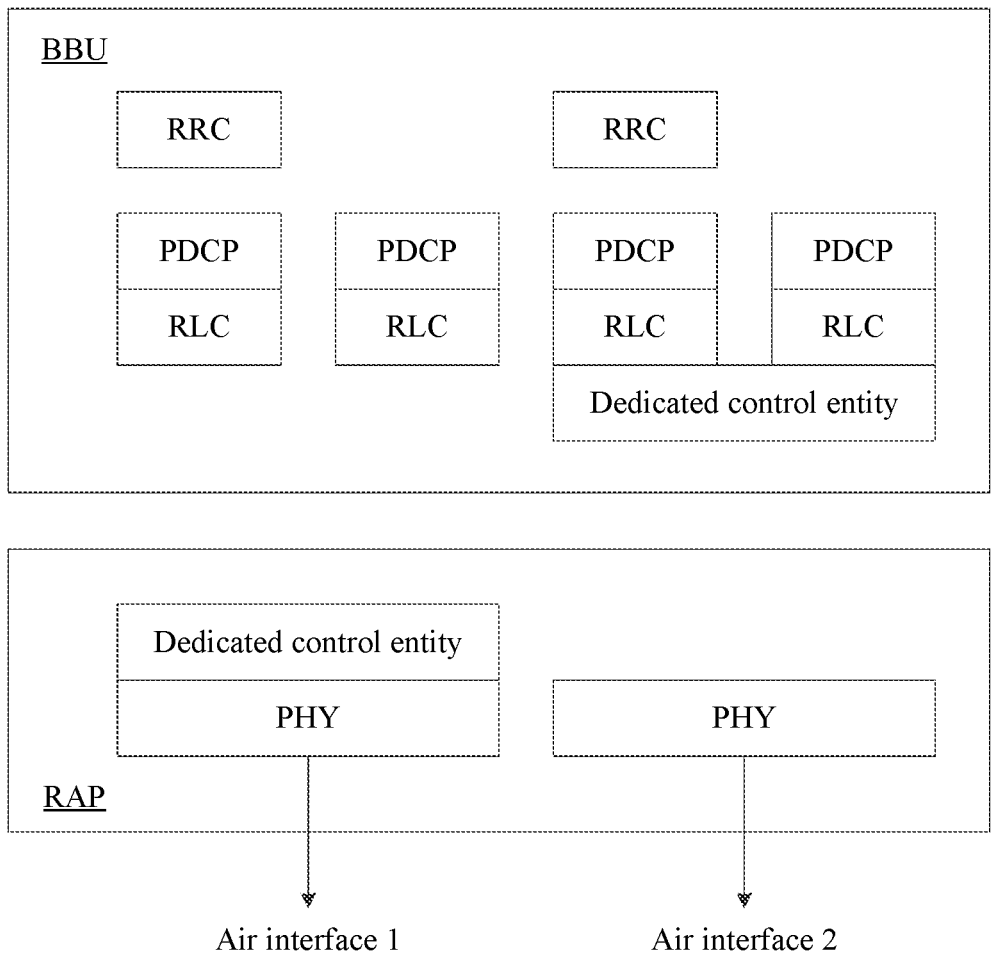

In FIG. 23, a radio resource control entity corresponding to each type of air interface, a Packet Data Convergence Protocol corresponding to each type of air interface, a radio link control entity corresponding to each type of air interface, and dedicated control entities corresponding to some air interfaces are disposed in a BBU, and dedicated control entities corresponding to the other air interfaces and a physical layer corresponding to each type of air interface are disposed in each RAP.

Figure 24:
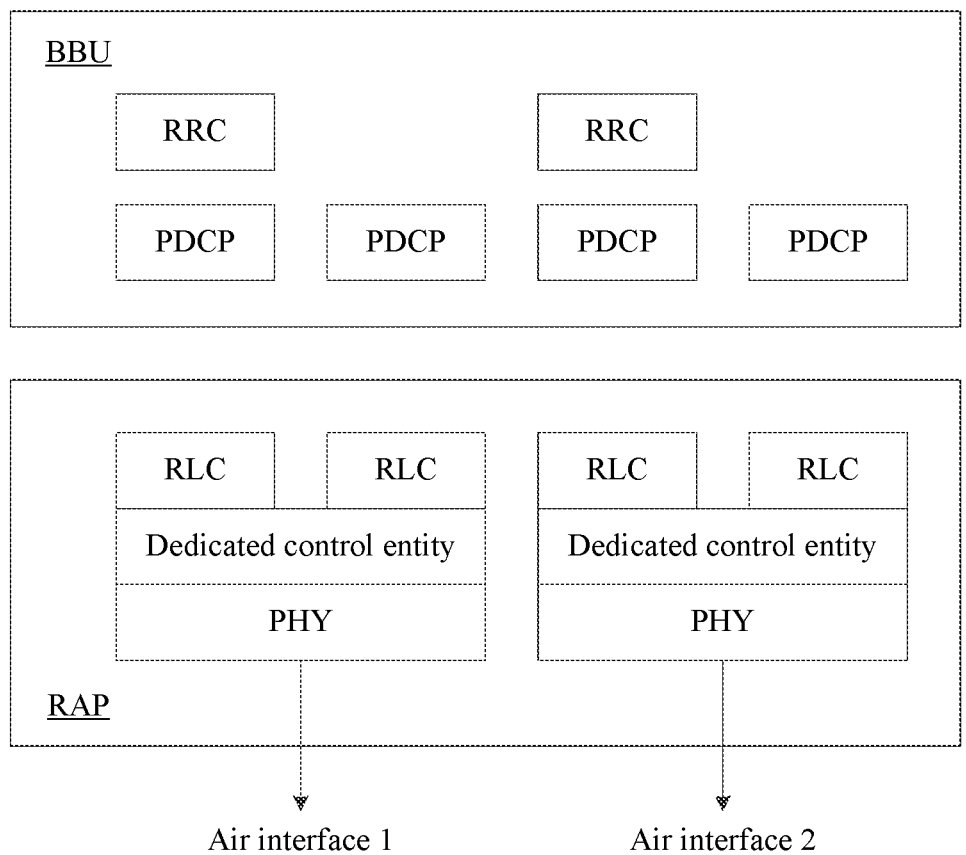

In FIG. 24, a radio resource control entity corresponding to each type of air interface and a Packet Data Convergence Protocol corresponding to each type of air interface are disposed in a BBU, and a radio link control entity corresponding to each type of air interface, a dedicated control entity corresponding to each type of air interface, and a physical layer corresponding to each type of air interface are disposed in each RAP.

Optionally, an uplink processing part and a downlink part of some or all of the dedicated control entities corresponding to the at least two types of air interfaces may be respectively disposed in the BBU and each RAP.

In the solution shown in any one of FIG. 21 to FIG. 24, dedicated control entities corresponding to various types of air interfaces may be implemented by a processor in the corresponding BBU or RAP by executing a corresponding software program.

In the solutions shown in FIG. 21 to FIG. 24, execution entities of a Media Access Control MAC layer of a radio access device are divided into a dedicated control entity corresponding to each of at least one type of air interface, and one dedicated control entity may independently implement a Media Access Control function of an air interface corresponding to the dedicated control entity, or one dedicated control entity may interact with the other of the dedicated control entities respectively corresponding to the at least two types of air interfaces, to implement the Media Access Control function of the air interface. For example, the dedicated control entity corresponding to each of the at least one type of air interface may negotiate to determine resources used by the various types of air interfaces, and separately performs, based on the resources obtained through negotiation, Media Access Control on a service transmitted on a corresponding air interface, so that the radio access device in a radio communications system supports a plurality of air interfaces. For a specific process in which the dedicated control entities interact and negotiate with each other to determine the resources used by the various types of air interfaces, refer to descriptions in the embodiment corresponding to FIG. 25.

Figure 25:
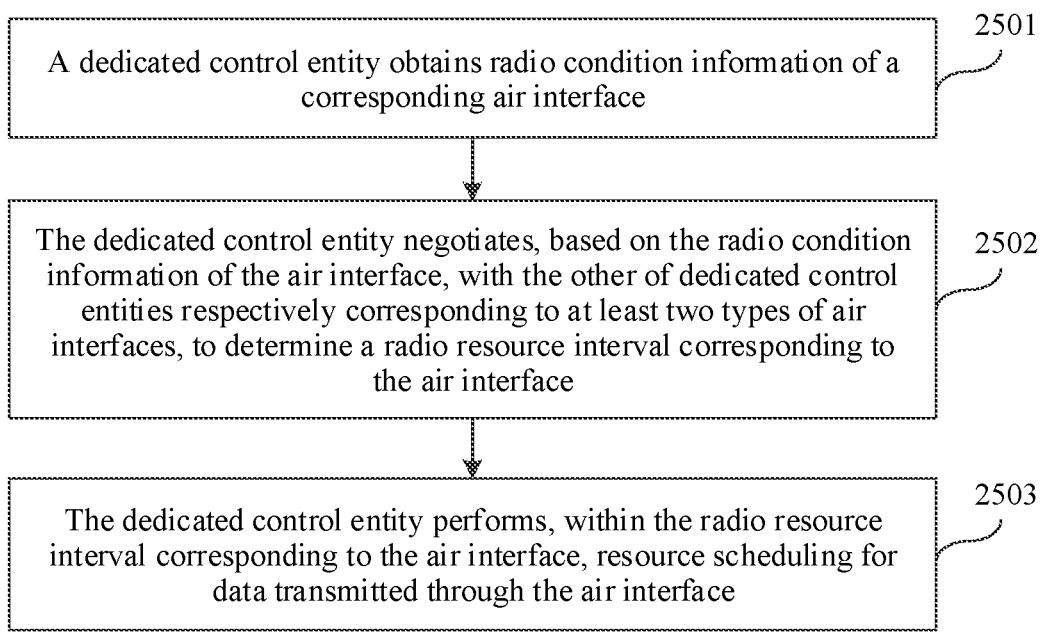
FIG. 25 is a flowchart of a Media Access Control method according to an embodiment of this application.

FIG. 25 is a flowchart of a Media Access Control method according to an embodiment of this application. The method may be applied to the radio access device 110 in the implementation environment shown in FIG. 1. The radio access device supports at least two types of air interfaces, the at least two types of air interfaces correspond to a same radio interface protocol, and the radio access device includes dedicated control entities respectively corresponding to the at least two types of air interfaces and a common control entity. As shown in FIG. 25, the method includes the following steps:

Step 2501: A dedicated control entity obtains radio condition information of a corresponding air interface.

Step 2502: The dedicated control entity negotiates, based on the radio condition information of the air interface, with the other of the dedicated control entities respectively corresponding to the at least two types of air interfaces, to determine a radio resource interval corresponding to the air interface.

Step 2503: The dedicated control entity performs, within the radio resource interval corresponding to the air interface, resource scheduling for data transmitted through the air interface.

In the solution shown in this embodiment of this application, one dedicated control entity may independently implement Media Access Control steps such as multiplexing/demultiplexing, priority processing, a hybrid automatic repeat request, and random access control other than resource scheduling in Media Access Control on a service transmitted through an air interface corresponding to the dedicated control entity.

In conclusion, in the Media Access Control method in this embodiment of this application, dedicated control entities corresponding to various types of air interfaces are configured in the radio access device that supports the at least two types of air interfaces, the dedicated control entities corresponding to the various types of air interfaces interact with each other to implement resource scheduling between the various types of air interfaces, and each dedicated control entity independently implements Media Access Control steps other than resource scheduling in Media Access Control on a service transmitted through an air interface corresponding to the dedicated control entity, to implement flexible multi-air interface resource allocation, so that a network architecture can support coexistence of a plurality of air interfaces, thereby better adapting to quality of service requirements of diversified services, improving spectrum utilization, and reducing fronthaul link costs.

In still another possible implementation, a radio access device supports at least three types of air interfaces. Media Access Control MAC entities corresponding to at least two types of air interfaces may include dedicated control entities respectively corresponding to the at least two types of air interfaces and one common control entity. For any one of the dedicated control entities respectively corresponding to the at least two types of air interfaces, the common control entity interacts with the dedicated control entity to implement a Media Access Control function. A Media Access Control MAC entity corresponding to each of at least one type of air interface other than the at least two types of air interfaces in the at least three types of air interfaces may include a dedicated control entity corresponding to each of the at least one type of air interface, and the dedicated control entity corresponding to each of the at least one type of air interface independently implements Media Access Control on a service transmitted through an air interface corresponding to the dedicated control entity.

Figure 26:
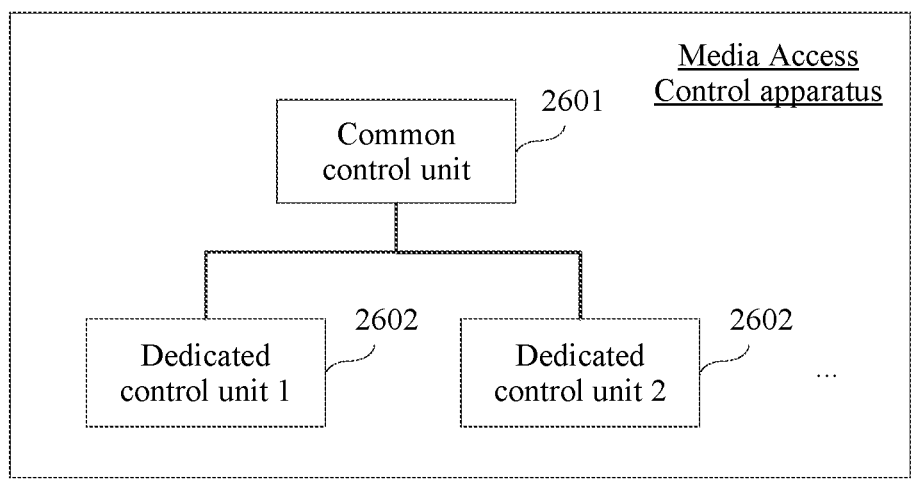
FIG. 26 is a block diagram of a Media Access Control apparatus according to an embodiment of this application.

FIG. 26 is a block diagram of a Media Access Control apparatus according to an embodiment of this application. The apparatus may be implemented, in a manner of hardware or a combination of software and hardware, as a part or all of the radio access device 110 in the network environment shown in FIG. 1, and the radio access device is configured to perform all or some steps in the method shown in any one of FIG. 9 to FIG. 20. The apparatus may include dedicated control units 2602 respectively corresponding to at least two types of air interfaces and a common control unit 2601.

In this embodiment, the apparatus is presented in a form of a functional unit. The "unit" herein may be an application-specific integrated circuit (application-specific integrated circuit, ASIC), a circuit, a processor that executes one or more software or firmware programs and a memory, an integrated logic circuit, and/or other devices that can provide the foregoing functions.

The common control unit 2601 has a function the same as or similar to that of the common control entity in the method shown in any one of FIG. 9 to FIG. 20.

The dedicated control unit 2602 has a function the same as or similar to that of the dedicated control entity in the method shown in any one of FIG. 9 to FIG. 20.

Figure 27:
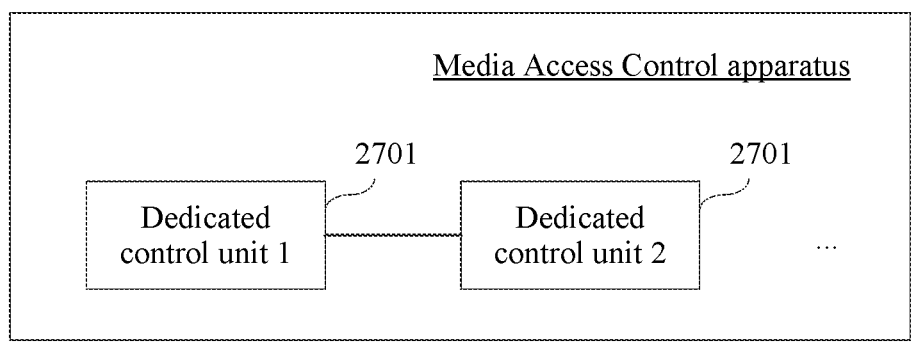
FIG. 27 is a block diagram of a Media Access Control apparatus according to an embodiment of this application.

FIG. 27 is a block diagram of a Media Access Control apparatus according to an embodiment of this application. The apparatus may be implemented, in a manner of hardware or a combination of software and hardware, as a part or all of the radio access device 110 in the network environment shown in FIG. 1, and the radio access device is configured to perform all or some steps in the method shown in FIG. 25. The apparatus may include dedicated control units 2701 respectively corresponding to at least two types of air interfaces.

In this embodiment, the apparatus is presented in a form of a functional unit. The "unit" herein may be an application-specific integrated circuit (application-specific integrated circuit, ASIC), a circuit, a processor that executes one or more software or firmware programs and a memory, an integrated logic circuit, and/or other devices that can provide the foregoing functions.

The dedicated control unit 2701 has a function the same as or similar to that of the dedicated control entity in the method shown in FIG. 25.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely example embodiments of this application, but are not intended to limit this application. Any modification, equivalent replacement, or improvement made without departing from the spirit and principle of this application shall fall within the protection scope of this application.

The invention claimed is:

1. A radio access device, wherein the radio access device supports at least two types of air interfaces, the radio access device communicates with a terminal by using a specified air interface, the specified air interface is at least one of the at least two types of air interfaces, and the radio access device comprises:
   dedicated control entities respectively corresponding to the at least two types of air interfaces; and
   a common control entity, wherein the common control entity is configured to:
      determine a dedicated control entity corresponding to the specified air interface between the radio access device and the terminal;
      interact with the dedicated control entity corresponding to the specified air interface, to implement a Media Access Control function of the specified air interface;
   wherein in response to the radio access device sending data to the terminal through the specified air interface:
      the common control entity is configured to: generate downlink grant information corresponding to the data, and transmit the downlink grant information to the dedicated control entity; and
      the dedicated control entity is configured to: send the downlink grant information to the terminal by using a physical layer of the specified air interface, receive, by using the physical layer of the specified air interface, a hybrid automatic repeat request response message that is returned by the terminal for the data, and send the hybrid automatic repeat request response message to the common control entity; and
      the common control entity is configured to determine, based on the hybrid automatic repeat request response message, to retransmit the data or send new data; and
   wherein in response to the radio access device receiving, through the specified air interface, data sent by the terminal,
      the common control entity is configured to: generate uplink grant information corresponding to the data, and transmit the uplink grant information to the dedicated control entity; and
      the dedicated control entity is configured to send the uplink grant information to the terminal by using the physical layer of the specified air interface; the dedicated control entity is configured to: after the data is received, generate a hybrid automatic repeat request response message for the data, and send the hybrid automatic repeat request response message to the terminal and the common control entity; and the common control entity is configured to generate new uplink grant information based on the hybrid automatic repeat request response message.

2. The radio access device according to claim 1, wherein in a process in which the common control entity interacts with the dedicated control entity corresponding to the specified air interface,
   the dedicated control entity is configured to: obtain radio condition information of the specified air interface, and send the radio condition information to the common control entity; and
   the common control entity is configured to: determine, based on the radio condition information, a radio resource interval corresponding to the specified air interface, and perform, within the radio resource interval corresponding to the specified air interface, resource scheduling for data transmitted through the specified air interface.

3. The radio access device according to claim 1, wherein in a process in which the common control entity interacts with the dedicated control entity corresponding to the specified air interface,
the common control entity is configured to: determine size information of a Media Access Control protocol data unit corresponding to the specified air interface, and send the size information to the dedicated control entity corresponding to the specified air interface and a radio link control entity corresponding to the specified air interface, wherein the radio link control entity is disposed in the radio access device;
the common control entity is configured to send, to the dedicated control entity, a radio link control protocol data unit delivered by the radio link control entity; and
the dedicated control entity is configured to: generate the Media Access Control protocol data unit based on the size information and the radio link control protocol data unit that is delivered by the radio link control entity, and send the Media Access Control protocol data unit to a physical layer corresponding to the specified air interface.

4. The radio access device according to claim 1, wherein in a process in which the common control entity interacts with the dedicated control entity corresponding to the specified air interface,
the dedicated control entity is configured to: determine size information of a Media Access Control protocol data unit scheduled for the specified air interface, and send the size information to the common control entity;
the common control entity is configured to: send the size information to a radio link control entity corresponding to the specified air interface, and send, to the dedicated control entity, a radio link control protocol data unit delivered by the radio link control entity, wherein the radio link control entity is disposed in the radio access device; and
the dedicated control entity is configured to: generate the Media Access Control protocol data unit based on the size information and the radio link control protocol data unit, and send the Media Access Control protocol data unit to a physical layer corresponding to the specified air interface.

5. The radio access device according to claim 3, wherein in the process in which the common control entity interacts with the dedicated control entity corresponding to the specified air interface,
the dedicated control entity is further configured to: receive data sent by the physical layer corresponding to the specified air interface, generate a Media Access Control service data unit based on the data sent by the physical layer, and send the Media Access Control service data unit to the common control entity; and
the common control entity is configured to send the Media Access Control service data unit to the radio link control entity corresponding to the specified air interface.

6. The radio access device according to claim 1, wherein:
the dedicated control entity is further configured to: receive a random access request message that is sent by the terminal through the specified air interface, and send the random access request message to the common control entity, wherein the random access request message comprises a random access preamble or a random access procedure message 3;
the common control entity is further configured to: interact with a radio resource control entity corresponding to the specified air interface to generate a response message corresponding to the random access request message, and send the response message to the dedicated control entity, wherein the response message comprises a random access response message or a contention resolution message, and the radio resource control entity is disposed in the radio access device; and
the dedicated control entity is further configured to send the response message to the terminal through the specified air interface.

7. The radio access device according to claim 1, wherein:
the dedicated control entity is further configured to receive a random access request message that is sent by the terminal through the specified air interface, wherein the random access request message comprises a random access preamble or a random access procedure message 3;
the dedicated control entity is further configured to interact, by using the common control entity, with a radio resource control entity corresponding to the specified air interface, to generate a response message corresponding to the random access request message, wherein the response message comprises a random access response message or a contention resolution message; and
the dedicated control entity is further configured to send the response message to the terminal through the specified air interface.

8. The radio access device according to claim 1,
wherein the radio access device is a distributed base station, and the radio access device comprises a base band unit (BBU) and a radio access point (RAP); and
wherein:
the common control entity is disposed in the BBU, and the dedicated control entities respectively corresponding to the at least two types of air interfaces are disposed in the RAP; or
the common control entity and some of the dedicated control entities respectively corresponding to the at least two types of air interfaces are disposed in the BBU, and the other of the dedicated control entities respectively corresponding to the at least two types of air interfaces are disposed in the RAP; or
the dedicated control entities respectively corresponding to the at least two types of air interfaces and the common control entity are disposed in the BBU; or
the dedicated control entities respectively corresponding to the at least two types of air interfaces and the common control entity are disposed in the RAP; or
the common control entity and an uplink processing part of the dedicated control entities respectively corresponding to the at least two types of air interfaces are disposed in the BBU, and a downlink processing part of the dedicated control entities respectively corresponding to the at least two types of air interfaces are disposed in the RAP; or
the common control entity and an uplink processing part of some of the dedicated control entities respectively corresponding to the at least two types of air interfaces are disposed in the BBU, and a downlink processing part of the some dedicated control entities and the other of the dedicated control entities respectively corresponding to the at least two types of air interfaces are disposed in the RAP.

9. A Media Access Control method, wherein the method is applied to a radio access device, the radio access device supports at least two types of air interfaces, the radio access device communicates with a terminal by using a specified air interface, the specified air interface is at least one of the at least two types of air interfaces, the radio access device comprises dedicated control entities respectively corresponding to the at least two types of air interfaces and a common control entity, and the method comprises:
  determining, by the common control entity, a dedicated control entity corresponding to the specified air interface between the radio access device and the terminal; and
  interacting, by the common control entity, with the dedicated control entity corresponding to the specified air interface, to implement a Media Access Control function of the specified air interface;
  wherein in response to the radio access device sending data to the terminal through the specified air interface, the dedicated control entity is configured to:
    generate downlink grant information corresponding to the data,
    send the downlink grant information to the terminal by using a physical layer of the specified air interface,
    receive, by using the physical layer of the specified air interface, a hybrid automatic repeat request response message that is returned by the terminal for the data, and
    determine, based on the hybrid automatic repeat request response message, to retransmit the data or send new data; and
  wherein in response to the radio access device receiving, through the specified air interface, data sent by the terminal, the dedicated control entity is configured to:
    generate uplink grant information corresponding to the data, and
    send the uplink grant information to the terminal;
    after the data is received, generate a hybrid automatic repeat request response message for the data, and send the hybrid automatic repeat request response message to the terminal; and
    generate new uplink grant information based on the hybrid automatic repeat request response message.

10. The method according to claim 9, wherein the interacting, by the common control entity, with the dedicated control entity corresponding to the specified air interface comprises:
  obtaining, by the dedicated control entity, radio condition information of the specified air interface, and sending the radio condition information to the common control entity; and
  determining, by the common control entity based on the radio condition information, a radio resource interval corresponding to the specified air interface, and performing, within the radio resource interval corresponding to the specified air interface, resource scheduling for data transmitted through the specified air interface.

11. The method according to claim 9, wherein the interacting, by the common control entity, with the dedicated control entity corresponding to the specified air interface comprises:
  determining, by the common control entity, size information of a Media Access Control protocol data unit corresponding to the specified air interface, and sending the size information to the dedicated control entity corresponding to the specified air interface and a radio link control entity corresponding to the specified air interface, wherein the radio link control entity is disposed in the radio access device;
  sending, by the common control entity to the dedicated control entity, a radio link control protocol data unit delivered by the radio link control entity; and
  generating, by the dedicated control entity, the Media Access Control protocol data unit based on the size information and the radio link control protocol data unit that is delivered by the radio link control entity, and sending the Media Access Control protocol data unit to a physical layer corresponding to the specified air interface.

12. The method according to claim 9, wherein the interacting, by the common control entity, with the dedicated control entity corresponding to the specified air interface comprises:
  determining, by the dedicated control entity, size information of a Media Access Control protocol data unit scheduled for the specified air interface, and sending the size information to the common control entity;
  sending, by the common control entity, the size information to a radio link control entity corresponding to the specified air interface, and sending, to the dedicated control entity, a radio link control protocol data unit delivered by the radio link control entity, wherein the radio link control entity is disposed in the radio access device; and
  generating, by the dedicated control entity, the Media Access Control protocol data unit based on the size information and the radio link control protocol data unit that is delivered by the radio link control entity, and sending the Media Access Control protocol data unit to a physical layer corresponding to the specified air interface.

13. The method according to claim 11, wherein the interacting, by the common control entity, with the dedicated control entity corresponding to the specified air interface comprises:
  receiving, by the dedicated control entity, data sent by the physical layer corresponding to the specified air interface, generating a Media Access Control service data unit based on the data sent by the physical layer, and sending the Media Access Control service data unit to the common control entity; and
  sending, by the common control entity, the Media Access Control service data unit to the radio link control entity corresponding to the specified air interface.

14. The method according to claim 9, further comprising:
  receiving, by the dedicated control entity, a random access request message that is sent by the terminal through the specified air interface, and sending the random access request message to the common control entity, wherein the random access request message comprises a random access preamble or a random access procedure message 3;
  interacting, by the common control entity, with a radio resource control entity corresponding to the specified air interface, to generate a response message corresponding to the random access request message, and sending the response message to the dedicated control entity, wherein the response message comprises a random access response message or a contention resolution message, and the radio resource control entity is disposed in the radio access device; and sending, by the dedicated control entity, the response message to the terminal through the specified air interface.

15. The method according to claim 9, further comprising:
receiving, by the dedicated control entity, a random access request message that is sent by the terminal through the specified air interface, wherein the random access request message comprises a random access preamble or a random access procedure message 3;
interacting, by the dedicated control entity by using the common control entity, with a radio resource control entity corresponding to the specified air interface, to generate a response message corresponding to the random access request message, wherein the response message comprises a random access response message or a contention resolution message, and the radio resource control entity is disposed in the radio access device; and
sending, by the dedicated control entity, the response message to the terminal through the specified air interface.

16. A radio access device, comprising:
dedicated control entities, wherein the radio access device supports at least two types of air interfaces, and the dedicated control entities respectively correspond to the at least two types of air interfaces,
wherein each dedicated control entity of the dedicated control entities is configured to interact with the other of the dedicated control entities respectively corresponding to the at least two types of air interfaces, to implement the Media Access Control function of the air interface; and
wherein each dedicated control entity is configured to:
obtain radio condition information of the corresponding air interface;
negotiate, based on the radio condition information of the air interface, with the other of the dedicated control entities respectively corresponding to the at least two types of air interfaces, to determine a radio resource interval corresponding to the air interface; and
perform, within the radio resource interval corresponding to the air interface, resource scheduling for data transmitted through the air interface.

17. The radio access device according to claim 16, wherein the radio access device is a distributed base station, and the radio access device comprises a base band unit (BBU) and a radio access point (RAP); and wherein:
the dedicated control entities respectively corresponding to the at least two types of air interfaces are disposed in the BBU; or
the dedicated control entities respectively corresponding to the at least two types of air interfaces are disposed in the RAP; or
some of the dedicated control entities respectively corresponding to the at least two types of air interfaces are disposed in the BBU, and the other of the dedicated control entities respectively corresponding to the at least two types of air interfaces are disposed in the RAP.

18. A Media Access Control method, wherein the method is applied to a radio access device, the radio access device supports at least two types of air interfaces, the radio access device comprises dedicated control entities respectively corresponding to the at least two types of air interfaces, and the method comprises:
interacting, by each of the dedicated control entities, with the other of the dedicated control entities respectively corresponding to the at least two types of air interfaces, to implement the Media Access Control function of the air interface, wherein the interacting, by each of the dedicated control entities, with the other of the dedicated control entities respectively corresponding to the at least two types of air interfaces comprises:
obtaining, by the dedicated control entity, radio condition information of the corresponding air interface; and
negotiating, by the dedicated control entity based on the radio condition information of the air interface, with the other of the dedicated control entities respectively corresponding to the at least two types of air interfaces, to determine a radio resource interval corresponding to the air interface, and performing, within the radio resource interval corresponding to the air interface, resource scheduling for data transmitted through the air interface.

19. The radio access device according to claim 4, wherein:
the dedicated control entity is further configured to:
receive data sent by the physical layer corresponding to the specified air interface, generate a Media Access Control service data unit based on the data sent by the physical layer, and send the Media Access Control service data unit to the common control entity; and
the common control entity is configured to send the Media Access Control service data unit to the radio link control entity corresponding to the specified air interface.

20. The method according to claim 12, further comprising:
receiving, by the dedicated control entity, data sent by the physical layer corresponding to the specified air interface, generating a Media Access Control service data unit based on the data sent by the physical layer, and sending the Media Access Control service data unit to the common control entity; and
sending, by the common control entity, the Media Access Control service data unit to the radio link control entity corresponding to the specified air interface.

* * * * *